(12) United States Patent
Matsunoshita et al.

(10) Patent No.: US 6,512,915 B2
(45) Date of Patent: Jan. 28, 2003

(54) RECORDING MEDIUM OUTPUTTING METHOD, DATABASE SERVER, RECORDING MEDIUM OUTPUTTING APPARATUS, AND RECORDING MEDIUM OUTPUTTING SYSTEM

(75) Inventors: Junichi Matsunoshita, Ebina (JP); Kengo Shinozaki, Ebina (JP); Koji Kameda, Ebina (JP); Hiroyuki Kawano, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/853,576

(22) Filed: May 14, 2001

(65) Prior Publication Data

US 2001/0053299 A1 Dec. 20, 2001

(30) Foreign Application Priority Data

Jun. 5, 2000 (JP) ........................................ 2000-168288

(51) Int. Cl.⁷ .......................... G03G 21/00; G03G 15/00
(52) U.S. Cl. ......................................... 399/366; 705/59
(58) Field of Search ............................. 399/2, 79, 80, 399/366; 705/59

(56) References Cited

U.S. PATENT DOCUMENTS 5,291,243 A    3/1994  Heckman et al. ............... 399/3
5,905,860 A  * 5/1999  Olsen et al. ............... 705/59 X

FOREIGN PATENT DOCUMENTS

| JP | A 6-258982 | 9/1994 |
| JP | A 7-231384 | 8/1995 |

* cited by examiner

*Primary Examiner*—Fred L. Braun
(74) *Attorney, Agent, or Firm*—Oliff & Berridge, PLC

(57) ABSTRACT

A method of outputting a recording medium on which forgery-inhibited data of a certificate of residence, securities, or the like which is obtained through a communication network such as a computer network and is inhibited to be forged by copying is printed directly from a printer without using a copy forgery preventing sheet. A recording medium outputting system of the invention is constructed by connecting a LAN having a DB server managing transmission/reception of data to/from a database disposed in a city office or the like, and a number of LANs each having a terminal and a printer installed in stores such as convenience stores via a communication line and the internet. Document data of a certificate or the like is retrieved from the database in the city office by operating the terminal, the retrieved document data is merged with a selected copy forgery preventing image data according to the kind of the certificate or the like, and the merged data is outputted from the printer installed in the store where the terminal is operated.

30 Claims, 16 Drawing Sheets

| NAME OF MUNICIPALITY | KIND OF CERTIFICATE | LATENT-IMAGE-BURIED IMAGE DATA |
|---|---|---|
| ADACHI WARD, TOKYO | CERTIFICATE OF RESIDENCE | LABG1 |
| | DOCUMENT CERTIFYING THAT A SEAL IS REGISTERED | LABG2 |
| | COPY OF ONE'S FAMILY REGISTER | LABG3 |
| ARAKAWA WARD, TOKYO | CERTIFICATE OF RESIDENCE | LABG4 |
| | DOCUMENT CERTIFYING THAT A SEAL IS REGISTERED | LABG5 |
| | COPY OF ONE'S FAMILY REGISTER | LABG6 |
| ⋮ | ⋮ | ⋮ |

FIG. 5A
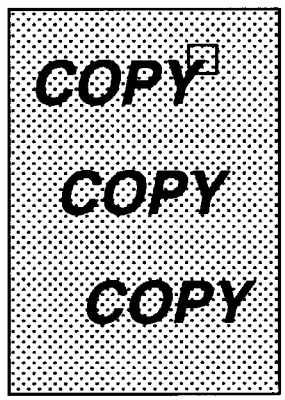
FIG. 5B
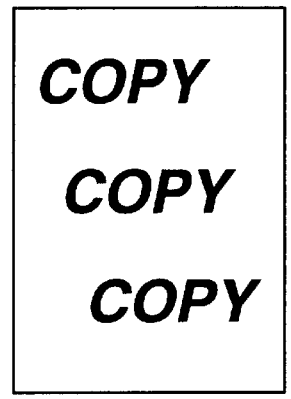
FIG. 5C
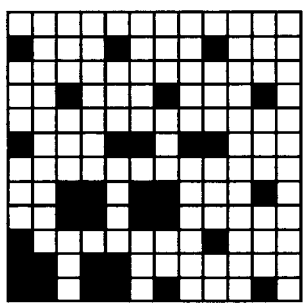
☐ WHITE PIXELS
■ BLACK PIXELS
FIG. 5D
```
0 0 0 0 0 0 0 0 0 0 0 0
1 0 0 0 1 0 0 0 1 0 0 0
0 0 0 0 0 0 0 0 0 0 0 0
0 0 1 0 0 0 1 0 0 0 1 0
0 0 0 0 0 0 0 0 0 0 0 0
1 0 0 0 1 1 0 1 1 0 0 0
0 0 0 0 0 0 0 0 0 0 0 0
0 0 1 1 0 1 1 0 0 0 1 0
0 0 1 1 0 1 1 0 0 0 0 0
1 0 0 0 0 0 0 0 1 0 0 0
1 1 0 1 1 0 0 0 0 0 0 0
1 1 0 1 1 0 1 0 0 0 1 0
```
FIG. 5E
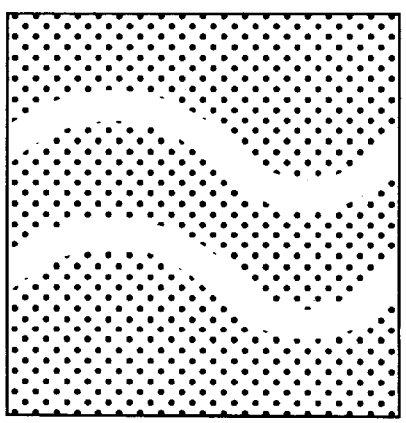
BACKGROUND IMAGE
ENLARGED VIEW
(CAMOUFLAGE PATTERN)
FIG. 5F
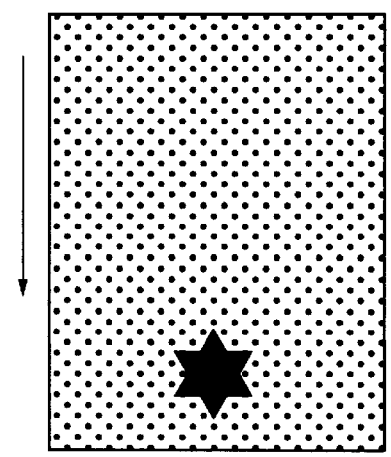
ENTIRE BACKGROUND
IMAGE

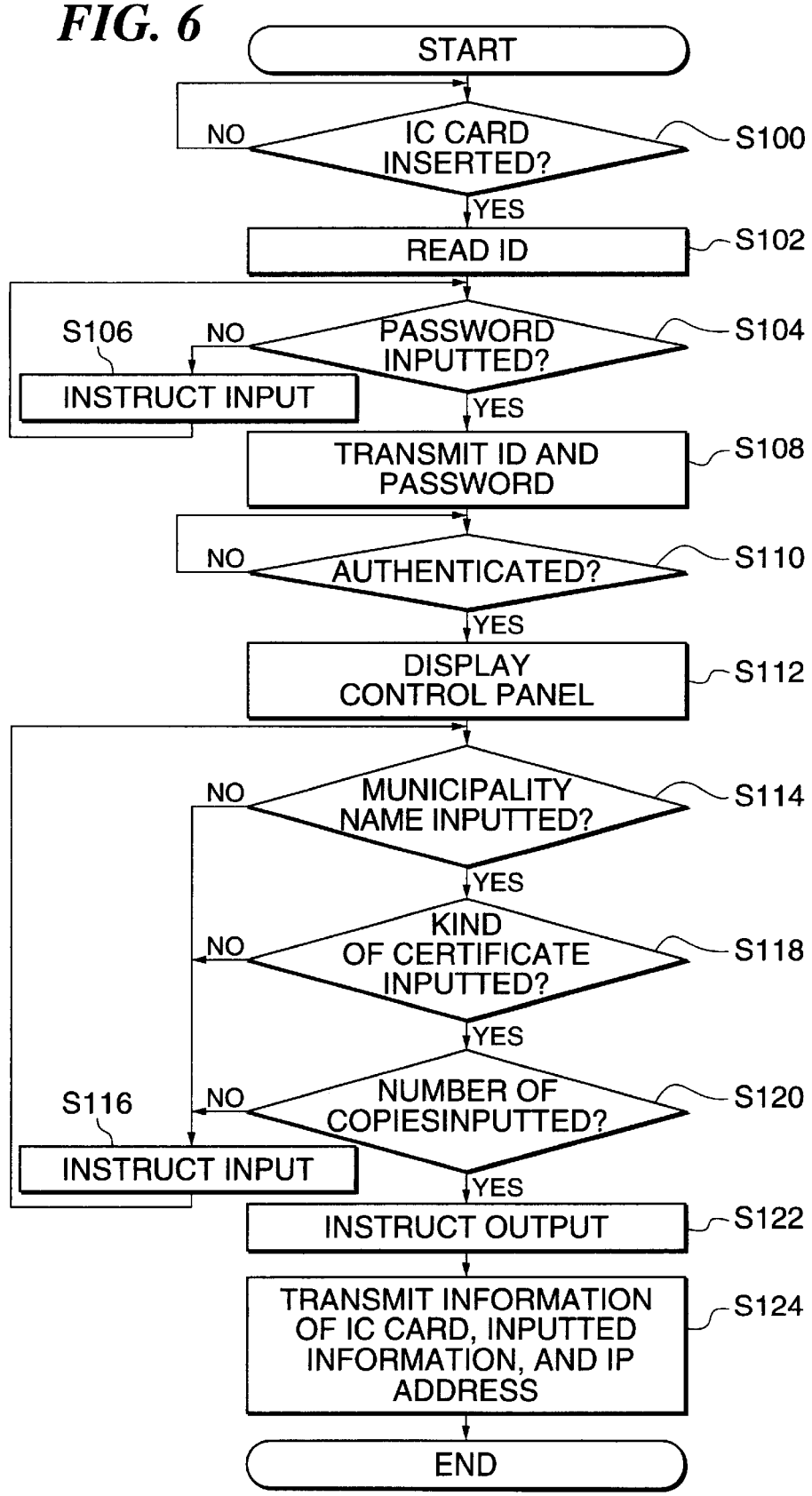

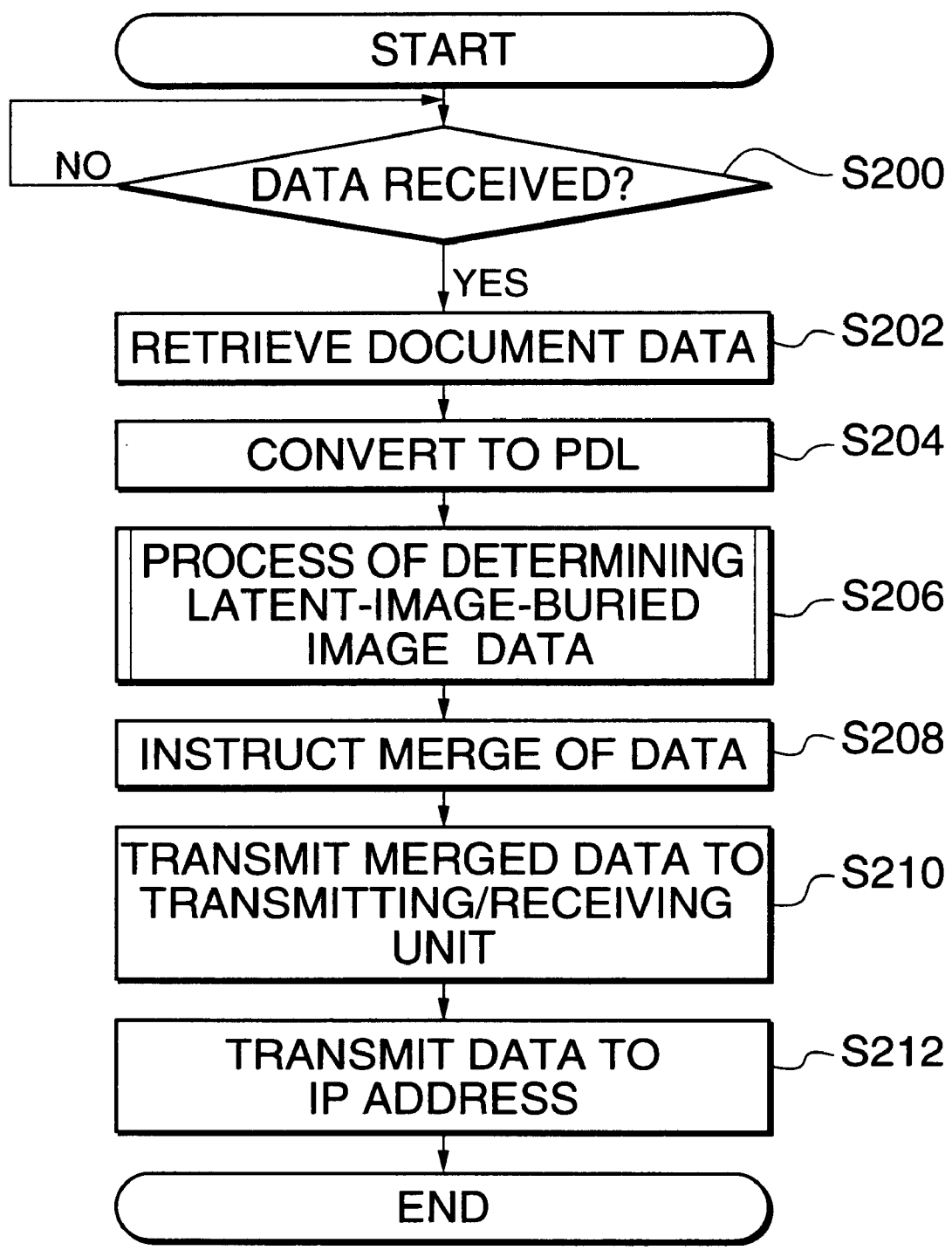

FIG. 10

| NAME OF MUNICIPALITY | KIND OF CERTIFICATE | BACKGROUND IMAGE DATA | MASK IMAGE DATA |
|---|---|---|---|
| ADACHI WARD, TOKYO | CERTIFICATE OF RESIDENCE | BG1 | LA1 |
| | DOCUMENT CERTIFYING THAT A SEAL IS REGISTERED | BG1 | LA2 |
| | COPY OF ONE'S FAMILY REGISTER | BG1 | LA3 |
| ARAKAWA WARD, TOKYO | CERTIFICATE OF RESIDENCE | BG2 | LA1 |
| | DOCUMENT CERTIFYING THAT A SEAL IS REGISTERED | BG2 | LA2 |
| | COPY OF ONE'S FAMILY REGISTER | BG2 | LA3 |
| ⋯⋯ | ⋯⋯ | ⋯⋯ | ⋯⋯ |

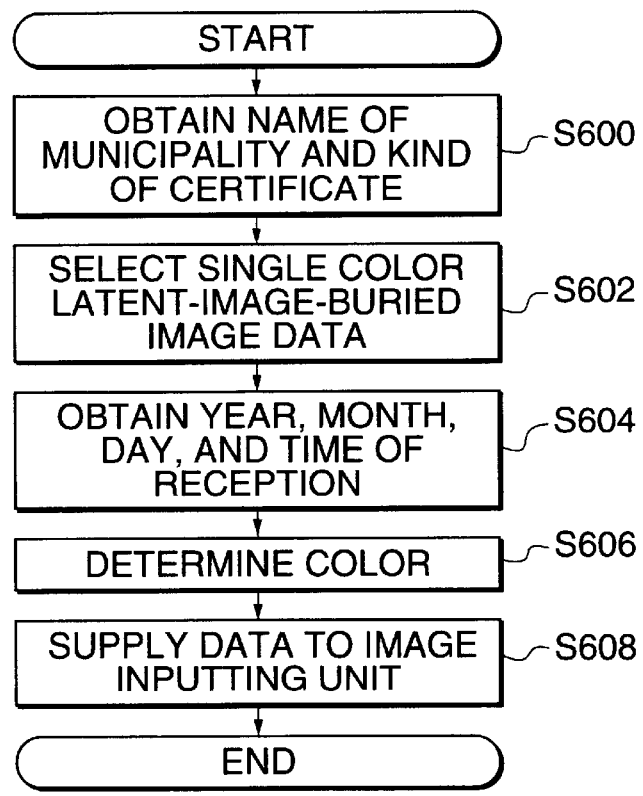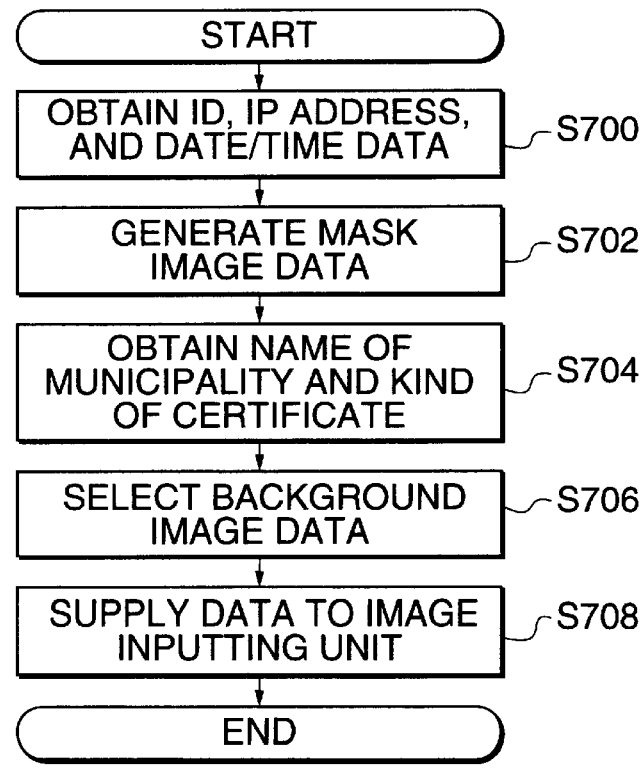

FIG. 20

| NAME OF MUNICIPALITY | KIND OF CERTIFICATE | BACKGROUND IMAGE DATA |
|---|---|---|
| ADACHI WARD, TOKYO | CERTIFICATE OF RESIDENCE | BG1 |
|  | DOCUMENT CERTIFYING THAT A SEAL IS REGISTERED | BG1 |
|  | COPY OF ONE'S FAMILY REGISTER | BG1 |
| ARAKAWA WARD, TOKYO | CERTIFICATE OF RESIDENCE | BG2 |
|  | DOCUMENT CERTIFYING THAT A SEAL IS REGISTERED | BG2 |
|  | COPY OF ONE'S FAMILY REGISTER | BG2 |
| ⋮ | ⋮ | ⋮ |

FIG. 21

| NAME OF MUNICIPALITY | KIND OF CERTIFICATE | IMAGE NUMBER |
|---|---|---|
| ADACHI WARD, TOKYO | CERTIFICATE OF RESIDENCE | 001 |
| | DOCUMENT CERTIFYING THAT A SEAL IS REGISTERED | 002 |
| | COPY OF ONE'S FAMILY REGISTER | 003 |
| ARAKAWA WARD, TOKYO | CERTIFICATE OF RESIDENCE | 004 |
| | DOCUMENT CERTIFYING THAT A SEAL IS REGISTERED | 005 |
| | COPY OF ONE'S FAMILY REGISTER | 006 |
| ...... | | ...... |

FIG. 22

| IMAGE NUMBER | LATENT-IMAGE-BURIED IMAGE DATA |
|---|---|
| 001 | LABG1 |
| 002 | LABG2 |
| 003 | LABG3 |
| 004 | LABG4 |
| 005 | LABG5 |
| 006 | LABG6 |
| ...... | ...... |

RECORDING MEDIUM OUTPUTTING METHOD, DATABASE SERVER, RECORDING MEDIUM OUTPUTTING APPARATUS, AND RECORDING MEDIUM OUTPUTTING SYSTEM

BACKGROUND OF THE INVENTION

1. Field of the Invention

The present invention relates to a recording medium outputting method, a database server, a recording medium outputting apparatus, and a recording medium outputting system. More particularly, the invention relates to a recording medium outputting method, a database server, a recording medium outputting apparatus, and a recording medium outputting system for obtaining data of a copy-forgery-inhibited secret document such as a certificate of residence, securities via a communication network such as the Internet, intranet, or computer network, merging the obtained data with a copy forgery preventing image capable of preventing forgery by copying, and outputting a recording medium on which printing is made according to the merged data directly from a printer.

2. Related Background Art

A virtual shop for selling commodities on a computer network such as the Internet or intranet has the convenience that the user can purchase various commodities by accessing the shop from a terminal. The contents dealt by the virtual shops are rapidly increasing to tours, music, books, insurance, and the like. Through a virtual shop, various commodities can be sold without displaying the commodities in an actual shop. Consequently, in many convenience stores, multimedia terminals are installed.

In recent years, by providing or connecting a color printer in/to the multimedia terminal, real-time on-demand output service such as sales of a picture of a star is becoming available. Since the convenience of the virtual shop further increases by such real-time on-demand output service, expansion of the contents, for example, issuance of securities such as a gift certificate, various tickets such as airline ticket and show ticket, a certificate of residence, and the like is expected.

In spite of the fact that a picture of a star or the like can be copied by a color copier, under present circumstances, no measure of protecting the copyright and the rights to one's portrait is taken. There is also the possibility that a secret document such as a certificate of residence related to the privacy of an individual, securities and a ticket are forged or counterfeited by being copied. When a measure of preventing illegal copying is not taken, such a secret document cannot be directly outputted from a printer by operating, for example, the multimedia terminal installed in a convenience store.

Conventionally, to prevent illegal copying of a secret document, a special sheet called a copy forgery prevention sheet is used. The copy forgery prevention sheet is a sheet on which a special pattern of characters of warning or the like which is not easily seen by the eyes of a human but appears when the sheet is copied by a copier is printed in advance. When a document printed on the copy forgery prevention sheet is copied by a copier, letters of warning such as "copy prohibited" appear conspicuously on a copy. An illegal act of copying can be psychologically suppressed, and the original and a copy can be discriminated from each other by the characters of warning.

When such copy forgery prevention sheets are loaded in a printer installed in a convenience store or the like and document data read from a database by operating the multimedia terminal is printed on the copy forgery prevention sheet, a secret document such as certificate of residence, securities and a ticket can be directly outputted from the printer.

Since special printing has to be performed in advance, the copy forgery prevention sheet has a problem such its cost is higher than a sheet used by an ordinary copier or printer. In the case of changing a design of a background pattern, a logo, a symbol mark, or the like, printing on sheets has to be newly performed. Consequently, it is not easy to change something in the sheet. In the case of a certificate of residence as an example, the user has to manage different copy forgery prevention sheets according to municipalities. The management cost is also a burden on the user.

SUMMARY OF THE INVENTION

The invention has been achieved in consideration of the problems of the conventional techniques and provides a recording medium outputting method, a database server, a recording medium outputting apparatus, and a recording medium outputting system capable of outputting a recording medium without using a copy forgery prevention sheet by merging copy-forgery-inhibited data inhibited by being forged by copying with corresponding copy forgery preventing image data capable of preventing forgery by copying and outputting a recording medium on which printing is made according to the merged data.

According to an aspect of the invention, there is provided a recording medium outputting method of outputting a recording medium on which printing is made according to copy-forgery-inhibited data inhibited to be forged by copying, including the steps of: retrieving a piece of copy-forgery-inhibited data according to information inputted through a terminal from a storing part in which plural pieces of copy-forgery-inhibited data inhibited to be forged by copying and plural pieces of copy forgery preventing image data of various kinds for preventing forgery by copying are stored, and selecting a piece of copy forgery preventing image data according to the retrieved piece of copy-forgery-inhibited data; and outputting a recording medium on which printing is made according to data obtained by merging the retrieved piece of copy-forgery-inhibited data with the selected piece of copy forgery preventing image data.

In the storing part, plural pieces of copy-forgery-inhibited data inhibited to be forged by copying and plural pieces of copy forgery preventing image data of various kinds for preventing forgery by copying are stored. From the storing part, copy-forgery-inhibited data according to the information inputted from the terminal is retrieved, and copy forgery preventing image data according to the retrieved copy-forgery-inhibited data is selected. A recording medium on which printing is made according to data obtained by merging the retrieved piece of copy-forgery-inhibited data with the selected piece of copy forgery preventing image data is outputted.

As described above, since the recording medium on which printing is made according to the data obtained by merging the retrieved piece of copy-forgery-inhibited data with the selected piece of copy forgery preventing image data is outputted, the recording medium can be outputted without using a copy forgery preventing sheet. Moreover, since the copy forgery preventing image data preliminarily generated and stored in the storing part is selected, a time required to output the recording medium can be short.

It is also possible to store the copy forgery preventing image data in the storing part in which the copy-forgeryinhibited data is stored, dispose the storing part on the retrieval side (for example, database server side), and select the copy forgery preventing image data on the retrieval side. It is also possible to store the copy forgery preventing image data in the storing part disposed on the retrieval side, store the copy-forgery-inhibited data in the storing part disposed on the output side (for example, print server side), and select the copy forgery preventing image data on the output side.

According to another aspect of the invention, there is also provided a database server including: a database for storing plural pieces of copy-forgery-inhibited data inhibited to be forged by copying and plural pieces of copy forgery preventing image data of various kinds for preventing forgery by copying; a retrieving and selecting part for retrieving a piece of copy-forgery-inhibited data according to information inputted through a terminal from the database, and selecting a piece of copy forgery preventing image data according to the retrieved piece of copy-forgery-inhibited data; and an outputting part for outputting the retrieved piece of copy-forgery-inhibited data and the selected piece of copy forgery preventing image data.

According to another aspect of the invention, there is also provided a recording medium outputting apparatus for outputting a recording medium on which printing is made according to copy-forgery-inhibited data inhibited to be forged by copying, including: a first storing part for storing plural pieces of copy-forgery-inhibited data inhibited to be forged by copying; a receiving part for receiving a piece of copy-forgery-inhibited data retrieved from the first storing part in accordance with information inputted through a terminal; a second storing part for storing plural pieces of copy forgery preventing image data of different kinds for preventing forgery by copying; a selecting part for selecting a piece of copy forgery preventing image data according to the received piece of copy-forgery-inhibited data from the second storing part; and an outputting part for outputting a recording medium on which printing is made according to data obtained by merging the received piece of copy-forgery-inhibited data and the selected piece of copy forgery preventing data.

By storing the copy forgery preventing image data in the second storing part on the output side, the amount of data transmitted to the recording medium outputting apparatus can be reduced.

According to further another aspect of the invention, there is provided a recording medium outputting system including: a terminal connected to a computer network, from which information for outputting a recording medium on which printing is made according to copy-forgery-inhibited data inhibited to be forged by copying is inputted; a database in which plural pieces of copy-forgery-inhibited data inhibited to be forged by copying and plural pieces of copy forgery preventing image data of various kinds for preventing forgery by copying are stored; and a database server connected to the computer network, which includes a retrieving and selecting part for retrieving a piece of the copy-forgery-inhibited data from the database in accordance with information inputted from the terminal and selecting a piece of copy forgery preventing image data according to the retrieved piece of copy-forgery-inhibited data, and an outputting part for merging the retrieved piece of copy-forgery-inhibited data and the selected piece of copy forgery preventing image data and outputting the merged data.

According to further another aspect of the invention, there is provided a recording medium outputting system having: a terminal connected to a computer network, from which information for outputting a recording medium on which printing is made according to copy-forgery-inhibited data inhibited to be forged by copying is inputted; a database in which plural pieces of copy-forgery-inhibited data inhibited to be forged by copying are stored; a database server connected to the computer network, which includes a retrieving part for retrieving a piece of the copy-forgery-inhibited data from the database in accordance with information inputted from the terminal, and an outputting part for outputting the retrieved piece of copy-forgery-inhibited data; and a print server connected to the computer network, which includes a memory in which plural pieces of copy forgery preventing image data of different kinds for preventing forgery by copying are stored, a selecting part for selecting a piece of copy forgery preventing image data according to the retrieved piece of copy-forgery-inhibited data, and an outputting part for merging the retrieved piece of copy-forgery-inhibited data and the piece of selected copy forgery preventing image data and outputting the merged data.

According to further another aspect of the invention, there is provided a recording medium outputting method of outputting a recording medium on which printing is made according to copy-forgery-inhibited data inhibited to be forged by copying, including the steps of: retrieving a piece of copy-forgery-inhibited data according to information inputted through a terminal from a storing part in which plural pieces of copy-forgery-inhibited data inhibited to be forged by copying are stored, and generating copy forgery preventing image data according to the retrieved piece of copy-forgery-inhibited data; and outputting a recording medium on which printing is made according to data obtained by merging the retrieved piece of copy-forgery-inhibited data with the generated copy forgery preventing image data.

In the storing part, plural pieces of copy-forgery-inhibited data inhibited to be forged by copying are stored in the storing part. The copy-forgery-inhibited data according to the invention from the terminal is retrieved from the storing part, copy forgery preventing image data according to the retrieved copy-forgery-inhibited data is generated, and a recording medium on which printing is made according to data obtained by merging the retrieved piece of copy-forgery-inhibited data with the generated copy forgery preventing image data is outputted.

Since the recording medium on which printing is made according to the data obtained by merging the retrieved piece of copy-forgery-inhibited data with the generated copy forgery preventing image data is outputted, the recording medium can be outputted without using a copy forgery preventing sheet. Moreover, since the copy forgery preventing image data is generated, the storage capacity of the storing part can be reduced.

According to further another aspect of the invention, there is provided a database server including: a database for storing plural pieces of copy-forgery-inhibited data inhibited to be forged by copying; a retrieving part for retrieving a piece of copy-forgery-inhibited data according to information inputted through a terminal from the database; a generating part for generating copy forgery preventing image data according to the retrieved piece of copy-forgery-inhibited data; and an outputting part for outputting the retrieved piece of copy-forgery-inhibited data and the generated copy forgery preventing image data.

According to further another aspect of the invention, there is provided a recording medium outputting apparatus for outputting a recording medium on which printing is made according to copy-forgery-inhibited data inhibited to be forged by copying, including: a storing part for storing plural pieces of copy-forgery-inhibited data inhibited to be forged by copying; a receiving part for receiving a piece of copy-forgery-inhibited data retrieved from the storing part in accordance with information inputted through a terminal; a generating part for generating copy forgery preventing image data according to the received piece of copy-forgery-inhibited data; and an outputting part for outputting a recording medium on which printing is made according to data obtained by merging the received piece of copy-forgery-inhibited data with the generated copy forgery preventing image data.

According to further another aspect of the invention, there is provided a recording medium outputting system including: a terminal connected to a computer network, from which information for outputting a recording medium on which printing is made according to copy-forgery-inhibited data inhibited to be forged by copying is inputted; a database in which plural pieces of copy-forgery-inhibited data inhibited to be forged by copying are stored; and a database server connected to the computer network, which includes a retrieving part for retrieving a piece of the copy-forgery-inhibited data from the database in accordance with the information inputted from the terminal, a generating part for generating copy forgery preventing image data according to the retrieved piece of copy-forgery-inhibited data, and an outputting part for merging the retrieved piece of copy-forgery-inhibited data and the generated copy forgery preventing image data and outputting the merged data.

According to further another aspect of the invention, there is provided a recording medium outputting system including: a terminal connected to a computer network, from which information for outputting a recording medium on which printing is made according to copy-forgery-inhibited data inhibited to be forged by copying is inputted; a database in which plural pieces of copy-forgery-inhibited data inhibited to be forged by copying is stored; a database server connected to the computer network, which includes a retrieving part for retrieving a piece of the copy-forgery-inhibited data from the database in accordance with the information inputted from the terminal, and an outputting part for outputting the retrieved piece of copy-forgery-inhibited data; and a print server connected to the computer network, which includes a generating part for generating copy forgery preventing image data according to retrieved piece of copy-forgery-inhibited data, and an outputting part for merging the retrieved piece of copy-forgery-inhibited data and the generated copy forgery preventing image data and outputting the merged data.

The copy-forgery-inhibited data inhibited to be forged by copying in the invention includes data having a copyright or right to one's portrait, or script data. The script data includes data of a certificate of residence, a document certifying that a seal is registered, or the like issued by a municipality and data of securities and the like. The data having a copyright or right to one's portrait includes data of ticket, picture, and the like.

In the case of generating the copy forgery preventing image data, the information inputted from the terminal is allowed to include at least one of information regarding an operator of the terminal, information regarding a terminal for outputting a recording medium, and information regarding a time of outputting a recording medium, and the copy forgery preventing image data can be generated according to the information from the terminal. For example, a character string indicative of information such as the name or ID number of the terminal operator, the IP address of an output terminal, and time/day/month/year of instruction of outputting a recording medium is buried as a latent image. In such a manner, a latent-image-buried image according to the information inputted from the terminal can be generated. By generating the copy forgery preventing image data in accordance with the information inputted from the terminal, the copy forgery preventing image data of a different kind can be merged with the document data and the merged data can be printed on the recording medium. Consequently, in the case where illegal copying is made, the distributing path of the illegal copy can be easily traced.

The kind of the copy forgery preventing image data can be varied according to at least one of the kind of copy-forgery-inhibited data and a source of providing the copy-forgery-inhibited data. For example, latent-image-buried image data in which an image indicative of information such as the kind of the copy-forgery-inhibited data and the source of providing the copy-forgery-inhibited data is buried as a latent image can be used. By changing the copy forgery preventing image data in accordance with information such as the kind of copy-forgery-inhibited data and the source of providing the copy-forgery-inhibited data, the kind of the copy-forgery-inhibited data and the source of providing the copy-forgery-inhibited data can be easily determined.

The following arrangement is also possible. The copy forgery preventing image data is constructed of a background portion which is not copied by a copier and a latent image portion reproduced by the copier, or of a background portion which is copied by a copier and a latent image portion which is not reproduced by the copier, and the kind of the copy forgery preventing image data is varied by changing the shape of the latent image portion or at least one of a color of the latent image portion and a color of the background portion. In this case, the color of the copy forgery preventing image data to be merged can be changed according to at least one of the kind of the copy-forgery-inhibited data, the source of providing the copy-forgery-inhibited data, and a time of outputting a recording medium. By changing the color of the copy forgery preventing image in accordance with at least one of the kind of the copy-forgery-inhibited data, the source of providing the copy-forgery-inhibited data, and the time of outputting a recording medium as described above, the kind of the copy-forgery-inhibited data, the source of providing the copy-forgery-inhibited data, and the time of outputting the recording medium can be easily determined.

It is also possible to vary a charge in accordance with at least one of an operator of the terminal, the kind of copy-forgery-inhibited data, presence/absence of an advertisement in the recording medium, a position of outputting the recording medium, and a time of outputting the recording medium.

BRIEF DESCRIPTION OF THE DRAWINGS

Preferred embodiments of the present invention will be described in detail based on the followings, wherein:

FIGS. 5A to 5F are diagrams for explaining a latent-image-buried image;

FIG. 6 is a flowchart showing the processing operation of a terminal of the first embodiment;

FIG. 7 is a flowchart showing the processing operation of a database server of the first embodiment;

FIG. 10 is a diagram showing another example of a table in which latent-image-buried image data in a database is stored;

FIG. 13 is a flowchart showing an interruption routine for a process of determining latent-image-buried image data in a third embodiment;

FIG. 14 is a flowchart showing an interruption routine for a process of determining latent-image-buried image data in a fourth embodiment;

FIG. 20 is a diagram showing an example of a table in which background image data in a database is stored;

FIG. 21 is a diagram showing an example of a table in which image numbers of latent-image-buried image data in a database are stored; and FIG. 22 is a diagram showing an example of a table in which latent-image-buried image data in a memory of a print server is stored.

DETAILED DESCRIPTION OF THE PREFERRED EMBODIMENTS

Embodiments of the invention will be described in detail hereinbelow with reference to the drawings.
(First Embodiment)

Figure 1:
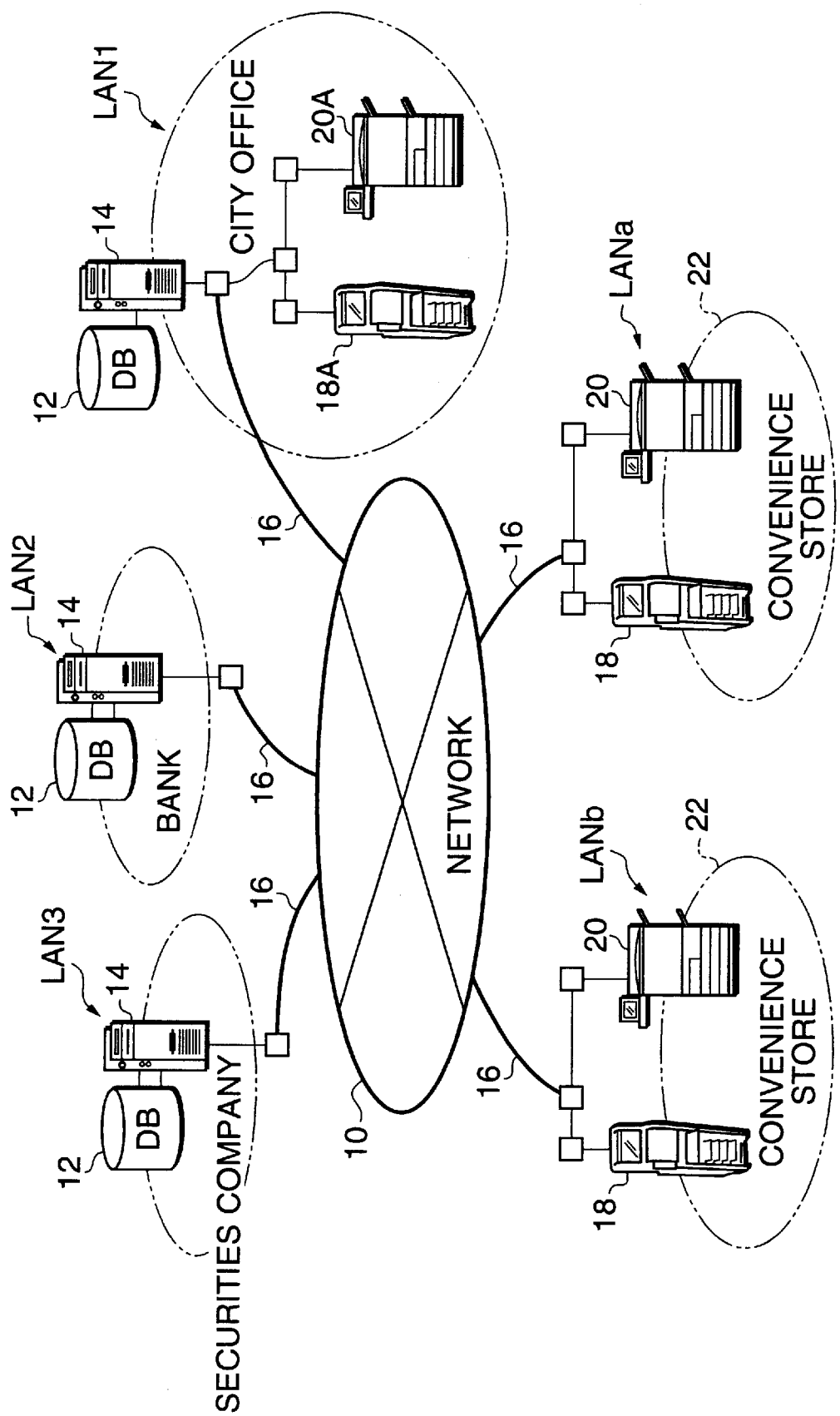
FIG. 1 is a conceptual diagram showing the configuration of a recording medium outputting system according to a first embodiment.

FIG. 1 shows a recording medium outputting system according to a first embodiment of the invention. In the embodiment of the invention, secret document data (for example, data of a document such as a certificate of residence, a copy of one's family register, or a document certifying that a seal is registered) is retrieved from a database of a city office by operating a terminal installed in a convenience store, and the retrieved data is outputted from a printer installed in the same store.

Figure 2:
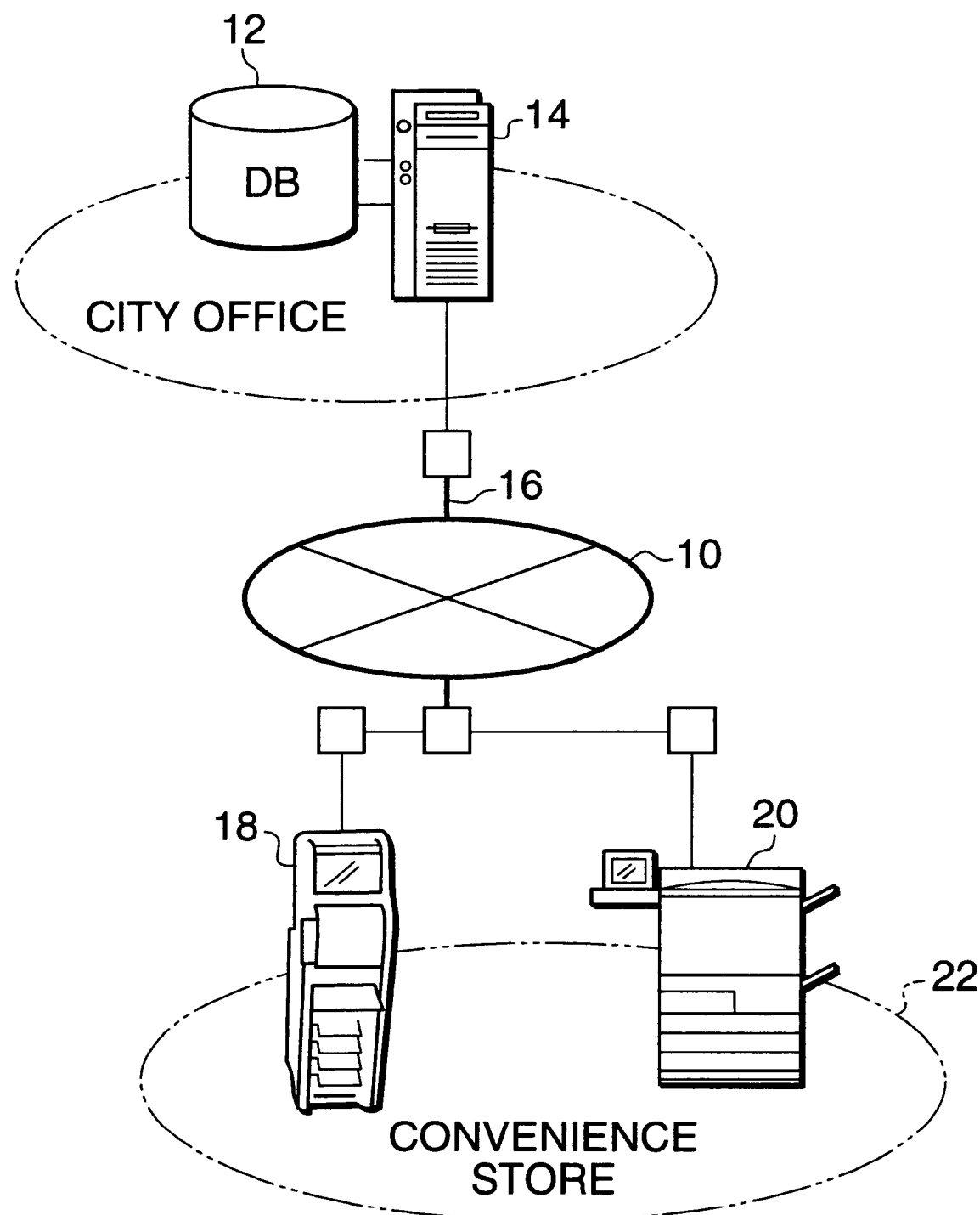
FIG. 2 is a conceptual diagram showing the configuration of a part of the recording medium outputting system according to the first embodiment.

As shown in FIGS. 1 and 2, the recording medium outputting system is constructed by connecting a LAN 1 having a database (DB) server 14 for managing transmission/reception of data to/from a database 12 disposed in a government and municipal office such as a city office and a number of local area networks LANa, LANb, . . . via communication lines 16 such as telephone lines and the Internet 10. The LANs LANa, LANb, . . . are provided in stores 22 such as convenience stores or post offices characterized by its larger number of stores, each having a terminal 18 for designating a document to be outputted, and a printer 20 for outputting the designated document. The terminal 18 and printer 20 installed in each of the stores 22 may be directly connected to the Internet 10 without constructing the LAN.

The terminal 18 has a CPU, a memory, an input/output device such as a touch panel, an IC card slot for reading an IC card, and the like. Although an ordinary printer is used as the printer 20, a color printer is particularly preferable.

To the LAN 1 disposed in a municipal office such as a city office, a terminal 18A and a printer 20A having configurations similar to the terminal and printer installed in each of the stores 22 are connected. LAN 2, LAN 3, . . . installed in companies such as employee-leasing company, bank, securities company, and nonlife insurance company which manage secret documents by key databases 12 are also connected to the Internet 10.

Figures 3, 4:
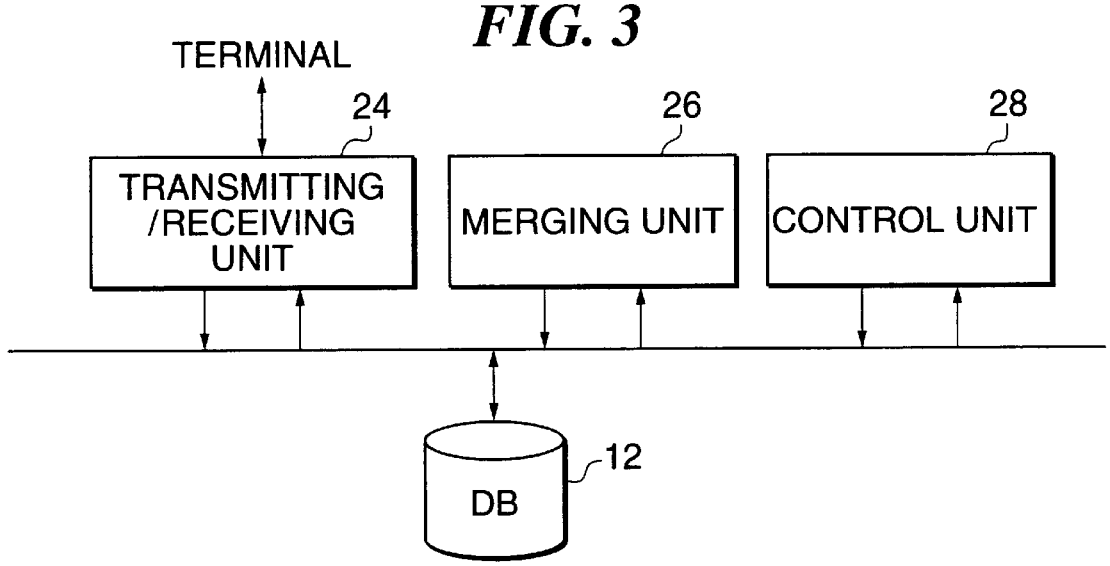
FIG. 3 is a block diagram showing the configuration of a database server.
FIG. 4 is a diagram showing an example of a table in which latent-image-buried image data in a database is stored.

As shown in FIG. 3, the DB server 14 to which the database 12 is connected has a transmitting/receiving unit 24 for transmitting/receiving data, a merging unit 26 for merging copy forgery preventing image data for preventing forgery by copying (latent-image-buried image data in the embodiment) and document data retrieved from the database 12, and a control unit 28 for controlling the units. The elements are connected to each other via a bus.

In the database 12 managed by the DB server 14, not only document data in basic resident register, original seal register, original family register, and the like of municipalities (not shown) all over the country but also preliminarily generated latent-image-buried image data LABG1, LABG2, LABG3, . . . are stored by municipalities and the kinds of certificates in a table as shown in FIG. 4. For example, a certificate of residence issued by the Adachi Ward Office in Tokyo corresponds to latent-image-buried image data LABG1. Different latent-image-buried image data LABG1, LABG2, LABG3, . . . is prepared for various document data as copy-forgery-inhibited data of municipalities which provide the document data. The latent-image-buried image data may be varied in accordance with only the municipalities or document data.

A latent-image-buried image will now be described. FIGS. 5A to 5F are diagrams showing an example of the latent-image-buried image. FIG. 5A shows the whole latent-image-buried image. The area of letters "COPY" in black in FIG. 5A corresponds to a latent image portion which is visualized when it is copied by a copier. The area surrounding the latent image portion is a background portion which is not visualized when it is copied. Since the latent image portion and the background portion are formed by using the same single color ink so that apparent colors and densities are the same, it is difficult to discriminate the letters "COPY" in the latent image portion in practice. When the latent-image-buried image is copied by a copier, however, the characters "COPY" appear on a copy as shown in FIG. 5B. FIG. 5C shows an enlarged image of a square area in FIG. 5A. The latent-image-buried image is constructed of fine white and black pixels. The latent image portion is constructed by arranging relatively large dots relatively nondensely, and the background portion is constructed by arranging relatively small dots relatively densely. FIG. 5D shows the enlarged image of FIG. 5C in the form of binary data.

When the original recording medium such as a sheet of paper on which the latent-image-buried image is recorded is copied, the dots constructing the latent image portion are copied with fidelity since they have the size and density resolved by a copier. However, the dots constructing the background portion are not copied since they have the size which cannot be resolved by the copier. Consequently, only the latent image pattern buried in the latent-image-buried image appears on a copy. By using this technique, when letters of warning such as "copy inhibited" are buried as a latent image in the latent-image-buried image, the letters of warning such as "copy inhibited" appear clearly on a copy. Consequently, illegal copying can be suppressed, and the original and a copy can be discriminated from each other.

As shown in FIG. 5E, fine patterns called camouflage patterns can be formed in the entire background portion of a latent-image-buried image. The camouflage pattern has a density lower than the other area. When the camouflage pattern is copied by a copier, it does not appear on a copy. As shown in FIG. 5F, a symbol mark of a municipality such as a mark of a city may be buried as a mask image in the latent-image-buried image. In FIG. 5F, a star-shaped figure is expressed as an example of the mark. Fine elements constructing the background image or mask image are not limited to dots but may be line screens.

Referring to the flowchart of FIG. 6, the processing operation of the terminal 18 installed in the store 22 will now be described.

An IC card in which information such as ID number and address is stored is distributed in advance from the municipality to the user. After the user inserts his/her IC card into the IC card slot formed in the terminal 18 and the insertion of the IC card is recognized in step 100, the information such as the ID number recorded on the inserted IC card is read in step 102. When the user operates the touch panel of the terminal 18 to input the password, the entry of the password is recognized in step 104. In step 108, the read ID number and the inputted password are sent as authentication information by which access is permitted to the DB server 14. When the password is not inputted, in step 106, the user is instructed to input the password by sound or display on the touch panel.

In step 110, whether the user is authenticated to obtain access by the DB server 14 or not is determined. When YES, in step 112, a control panel for selecting municipality name, the kind of a certificate (for example, certificate of residence, document certifying that a seal is registered, or copy of one's family register) and the number of necessary copies of the certificate is displayed on the touch panel.

The user operates the touch panel on which the control panel is displayed to select the municipality name (for example, "Adachi Ward Office"), the kind of a certificate (for example "certificate of residence"), and the number of necessary copies (for example, "1"), and selects "output", thereby giving a certificate output instruction. In the above steps 114 to 120, whether the municipality name is inputted or not, the kind of the certificate is inputted or not, and the number of necessary copies is inputted or not are sequentially determined. When any of them is not inputted, an instruction is given to the user to input the information in step 116. In such a manner, the entry of the information necessary to instruct an output is completed. When "output" is selected in step 122, the information read from the IC card, information inputted from the touch panel, and an IP (Internet Protocol) address of the printer 20 as an output destination are transmitted to the DB server 14 together with time/day/month/year of acceptance as necessary. It is also possible to selectively instruct "on-line output" and "off-line output".

The information read from the IC card corresponds to information regarding the operator of the terminal. The IP address of the printer corresponds to information regarding an output terminal (output location) of the recording medium. The time/day/month/year of receipt of a job corresponds to information regarding a time of outputting a recording medium. Since a job is received and outputted almost simultaneously, the time/day/month/year of reception may be used as information regarding the time of outputting a recording medium.

The processing operation of the DB server 14 will now be described by referring to the flowchart of FIG. 7.

When it is determined in step 200 that the information read from the IC card of the user, information inputted from the touch panel, and the IP address which are sent from the terminal 18 are received by the transmitting/receiving unit 24, in step 202, on the basis of the received information, the document data of the certificate instructed to be outputted is retrieved from the database 12. For example, when the certificate instructed to be outputted by the user is "certificate of residence", the basic residence register of the selected municipality is searched. When the document instructed to be outputted by the user is "document certifying that a seal is registered", the original seal register of the selected municipality is searched.

In step 204, the retrieved document data is read and is converted to document image data described in the PDL (Printer Description Language) (hereinbelow, also called PDL data) by using a printer driver installed in the DB server 14.

Figure 8:
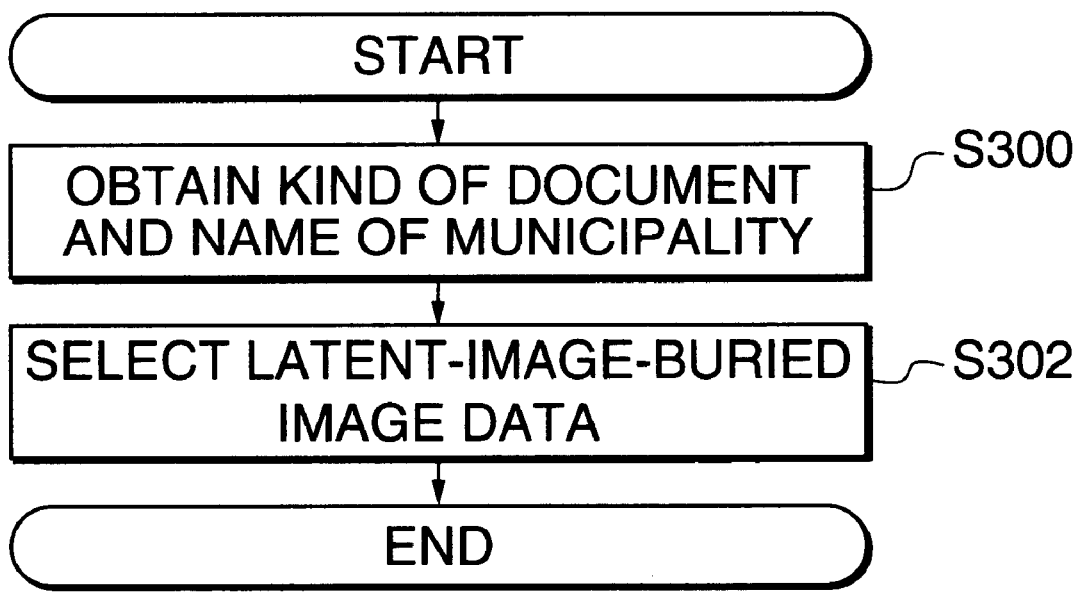
FIG. 8 is a flowchart showing an interruption routine for a process of determining latent-image-buried image data in the first embodiment.

In step 206, as shown in FIG. 8, a process of determining latent-image-buried image is performed. Specifically, in step 300, data of the kind of the certificate and the municipality name is obtained. In step 302, by using the table shown in FIG. 4, the latent-image-buried image data corresponding to the kind of the certificate and the municipality name is selected.

After the latent-image-buried image data is determined, in step 208, a merge between the document image data and the latent-image-buried image data is instructed to the merging unit 26. The merging unit 26 does not merge the latent-image-buried image data directly with the document image data by an imaging process but analyzes the PDL data generated in step 204 and inserts a command for merging the selected latent-image-buried image data in a predetermined position in the PDL data and the latent-image-buried image data. By the operation, the latent-image-buried image data inserted to the PDL data in the printer 20 is merged with the document image data. After that, the PDL data in which the command and the latent-image-buried image data are inserted is controlled to be transferred to the transmitting/receiving unit 24 in step 210, and sent from the transmitting/receiving unit 24 to the printer 20 specified by the IP address in step 212.

Figure 9:
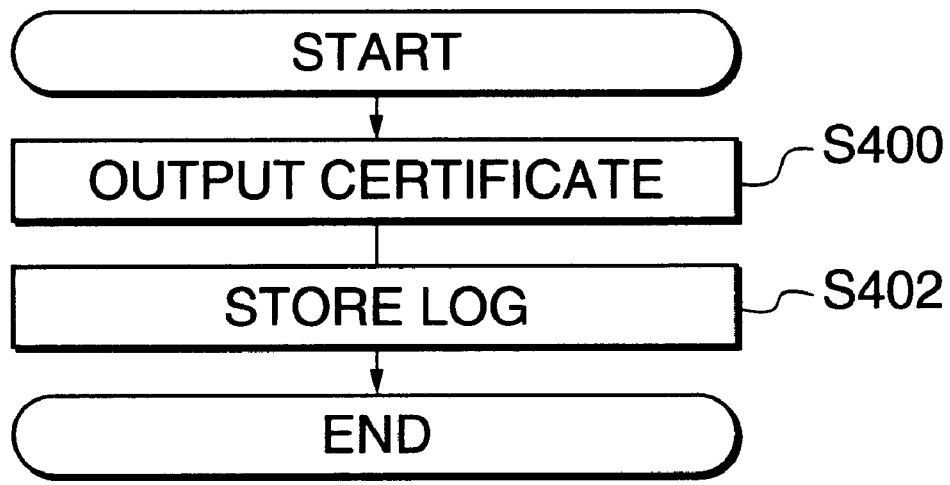
FIG. 9 is a flowchart showing the processing operation of a printer.

On receipt of the data from the DB server 14, as shown in FIG. 9, the printer 20 outputs a document to which the latent-image-buried image is added on the basis of the merged data transmitted from the DB server 14 in step 400. In step 402, a log (print history such as output document data, output time, and destination) is stored by using a log managing function of the printer 20. In such a manner, a sheet of paper (certificate) on which an image obtained by merging the document image and the latent-image-buried image is printed is outputted from the printer 20.

In the embodiment, in the DB server, merged data is generated by merging the document data of the secret document read from the database of the city office with the latent-image-buried image. The merged data is transmitted to the printer as a destination, and the image based on the merged data is outputted. Thus, a secret document to which the copy forgery preventing image is added can be outputted without using the copy forgery preventing sheet.

Since the latent-image-buried image data is preliminarily generated and stored in the database and is selected and merged with document data, just a short time is required to output a secret document from the printer. Further, since various latent-image-buried image data is prepared according to the kinds of certificate and the municipality names, the kind of the certificate and the name of the municipality issuing the certificate can be easily determined.

(Second Embodiment)

A second embodiment of the invention will now be described. In the embodiment, in order to generate the above-described latent-image-buried image data each time a job is received, background image data and mask image data from which the latent-image-buried image data is generated is stored in the database 12.

Since the second embodiment is similar to the first embodiment, a description of the same components as those in the first embodiment will not be repeated and the different point will be mainly described. First, in the database 12, as shown in FIG. 10, background image data BG1, BG2, . . . and mask image data LA1, LA2, LA3, . . . are stored in a table by the names of municipalities and the kinds of certificates. In the second embodiment, the background image data and the mask image data from which the latent-image-buried image data preliminarily generated in the first embodiment is generated are separately stored.

Figure 11:
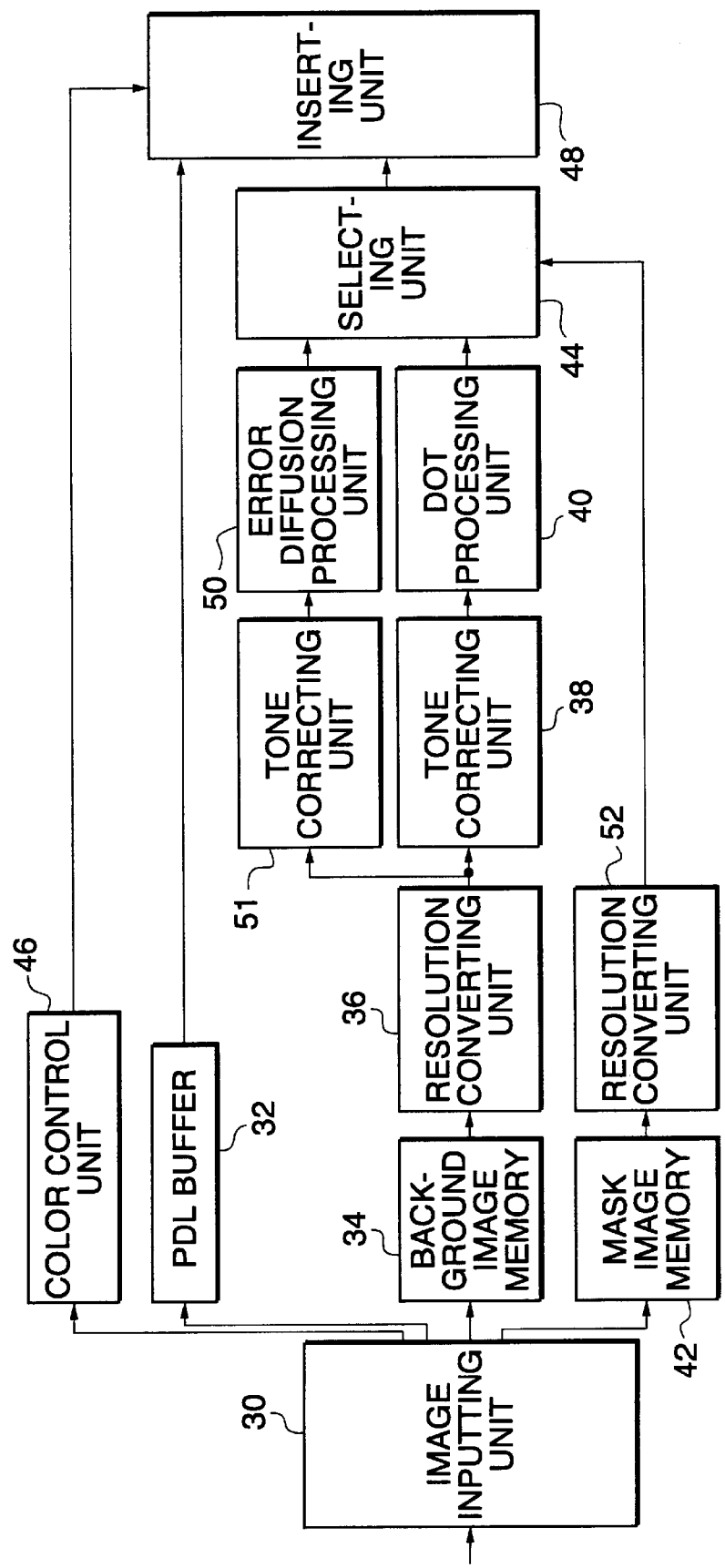
FIG. 11 is a block diagram showing the configuration of a merging unit in a database server in a recording medium outputting system according to a second embodiment.

The merging unit 26 in the second embodiment has, as shown in FIG. 11, an image inputting unit 30, a PDL buffer 32, a background image memory 34, resolution converting units 36 and 52, tone correcting units 38 and 51, a dot processing unit 40, a mask image memory 42, a selecting unit 44, a color control unit 46, an inserting unit 48, and an error diffusion processing unit 50.

The image inputting unit 30 receives PDL data of document data as a main image recorded on the background (for example, data of a certificate of residence, a document certifying that a seal is registered, or a copy of family register), background image data, mask image data buried as a latent image in the background image, and color information of a color of the background image and the like. The PDL buffer 32 temporarily stores the document image data described in the PDL as a main image. The background image memory 34 temporarily stores the background image. The mask image memory 42 temporarily stores a mask image. The background image and the mask image may be of a resolution lower than that of an image to be outputted.

The resolution converting unit 36 converts the resolution of the background image read from the background image memory 34 into an output resolution. The tone correcting unit 38 performs a tone correcting process on the background image of which resolution has been converted by the resolution converting unit 36 so that the density on a sheet of the background image to be subjected to a dotting process by the dot processing unit 40 at the post stage is almost equal to that of the original background image. The tone correcting unit 38 can perform the converting process by using, for example, an LUT and a predetermined function. The dot processing unit 40 performs the dotting process with the number of lines smaller than the number of output lines onto the background image of which gray-scale has been corrected by the tone correcting unit 38.

The tone correcting unit 51 performs tone correction on the background image data of which resolution has been converted by the resolution converting unit 36 so that density of a background image to be subjected to an error diffusion process by the error diffusion processing unit 50 at the post stage and that of the background image subjected to the dotting process, reproduced on a sheet are almost equal to each other. The error diffusion processing unit 50 carries out an error diffusion process on the background image of which gray-scale has been corrected by the tone correcting unit 51.

The resolution converting unit 52 converts the resolution of the mask image stored in the mask image memory 42 into the output resolution.

The selecting unit 44 selects either the background image subjected to the dotting process by the dot processing unit 40 or the background image which is not subjected to the dotting process in accordance with the value of a pixel in the mask image of which resolution has been converted by the resolution converting unit 52 and outputs the selected image. By the operation, the mask image can be buried as a latent image in the background image. An image to be outputted will be called a latent-image-buried image.

The color control unit 46 designates a color component for a merge. The inserting unit 48 analyzes the PDL data read from the PDL buffer 32 and inserts the command of merging the latent-image-buried image data in a predetermined position of the PDL data and the latent-image-buried image data.

The processing operation of the DB server 14 will now be described. The processing operation of the DB server 14 in the embodiment is the same as that of the DB server 14 in the first embodiment shown in FIG. 7 except for step 206 where the process of determining the latent-image-buried image data is performed, so that a description on the same part will not be repeated.

Figure 12:
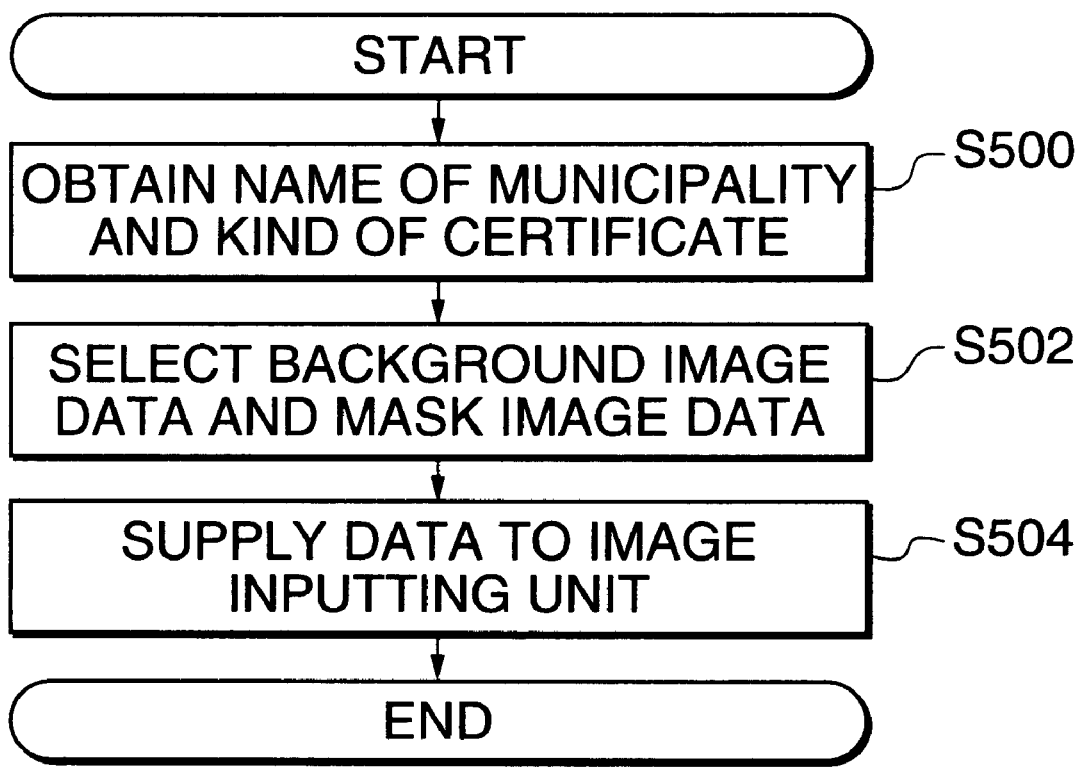
FIG. 12 is a flowchart showing an interruption routine for a process of determining latent-image-buried image data in the second embodiment.

As shown in FIG. 12, in the process of determining the latent-image-buried image data in the second embodiment, in step 500, data of the kind of certificate and the name of a municipality are obtained. In step 502, by using the table of FIG. 10, the background image data and the mask image data corresponding to the kind of the certificate and the name of the municipality are selected. After selecting the background image data and the mask image data, in step 504, the background image data, the mask image data, and the PDL data are supplied to the image inputting unit 30 in the merging unit 26.

The background image data and the mask image data supplied to the image inputting unit 30 are stored into the background image memory 34 and the mask image memory 42, respectively. The PDL data supplied to the image inputting unit 30 is stored into the PDL buffer 32.

After the PDL data is stored into the PDL buffer 32, the process of generating the latent-image-buried image data and inserting the latent-image-buried image data into the PDL data starts.

First, the background image is read from the background image memory 34. The resolution of the read background image is converted to the output resolution by the resolution converting unit 36. The background image which has been subjected to the resolution conversion is outputted to the tone correcting units 38 and 51.

In the tone correcting unit 38, the tone correcting process is performed on the supplied background image. The tone correcting process is performed to correct a change in the gray-scale characteristic in the dot processing unit 40 at the post stage. The tone corrected background image is subjected to the dotting process with the number of lines smaller than the number of output lines in the dot processing unit 40. For example, the background image can be converted by, for example, organized dithering to a dotted image having gray-scale levels 0 or 255 and the number of dot lines of 50. The dotted background image is outputted to the selecting unit 44.

In the tone correcting unit 51, the tone correcting process is performed on the supplied background image. The tone correcting process is performed to correct a change in the gray-scale characteristic in the error diffusion processing unit 50 at the post stage. The tone corrected background image is subjected to the error diffusion process in the error diffusion processing unit 50. The background image subjected to the error diffusion is outputted to the selecting unit 44.

In parallel with the processes on the background image, a process on the mask image is performed. A mask image is read from the mask image memory 42 and is converted to have the output resolution by the resolution converting unit 52. The mask image subjected to the resolution conversion is supplied as a selection signal to the selecting unit 44.

When the pixel value in the mask image as a selection signal is, for example, "1" (black pixel), the selecting unit 44 selects and outputs the pixel value of the dotted background image. When the pixel value is "0" (white pixel), the selecting unit 44 selects the pixel value of the background image subjected to the error diffusion. In the example shown in FIG. 5, the letter pattern of "COPY" or the like is drawn in the mask image. Consequently, as an image outputted from the selecting unit 44, the dotted background image is selected for the area corresponding to the letter pattern of "COPY" or the like in the background image data, and the other area is made by error-diffused isolated dots. An output of the selecting unit 44 is latent-image-buried image data. The latent-image-buried image data is outputted to the inserting unit 48.

The inserting unit 48 reads out the PDL data from the PDL buffer 32, analyzes the PDL data, and inserts the command of merging the selected latent-image-buried image data and the latent-image-buried image data into a predetermined position in the PDL data. The command of merging the latent-image-buried image data can designate a color component for a merge. As the merge color component, one or more of four colors of YMCK as developing colors of the printer can be designated. The color is designated by color control information set in the color control unit 46.

For example, in the case of designating a C component as the merge color component, when the PDL data received is developed to a raster in the printer 20, the inserted latent-image-buried image data is merged with only the C component, and the resultant data is printed. That is, a background pattern in cyan color (light blue) is merged with the background. By designating YMC as merge color components and inserting the latent-image-buried image data of YMC planes, a latent-image-buried image in an arbitrary color can be formed. The PDL data in which the latent-image-buried image data is inserted is controlled to be transferred to the transmitting/receiving unit 24 and finally transmitted to the printer 20 specified by the IP address.

In the embodiment, in the DB server, merged data is generated by merging the document data of a secret document read from the database of the city office and the latent-image-buried image data and transmitted to the printer as a destination, and an image based on the merged data is outputted. Consequently, the secret document to which the copy forgery preventing image is added can be outputted without using the copy forgery preventing sheet.

Since the different latent-image-buried image data is prepared according to the kinds of certificates and the municipality names, the kind of the certificate and the name of the municipality issuing the certificate can be easily determined.

Although the case where the document image data is a monochrome image and the case where the document image data is a color image have been described above, for example, according to the kind of a certificate, the merged data may be generated while changing the color of either the background image or mask image. In this case as well, the document image, background image, and mask image are merged in an arbitrary color as described above.

In the configuration of FIG. 11, in order to further reduce the memory capacity, a background image and a mask image of low resolution can be compressed and stored. In this case, reversible compression such as MMR or JBIG can be used for the mask image and, irreversible compression such as JPEG can be used for the background image. Obviously, the compressing method and the like are arbitrary.

(Third Embodiment)

A third embodiment of the invention will now be described. In the embodiment, the color of the latent-image-buried image described above is changed according to time/day/month/year of reception of a job.

Since the third embodiment is similar to the second embodiment, a description of the same part as that in the second embodiment will not be repeated and the different point will be mainly described. First, in the database 12, as described in the second embodiment, the background image data of different kinds and the mask image data are stored in a table by the municipalities and the kinds of certificates. Each of the background image data and the mask image data is of a single color.

The processing operation of the DB server 14 is the same as that of the DB server 14 in the first embodiment shown in FIG. 7 except for step 206 where the process of determining the latent-image-buried image data is performed. A description of the same part will not be repeated.

As shown in FIG. 13, in the process of determining the latent-image-buried image data, in step 600, data of the kind of a certificate and the name of the municipality is obtained. In step 602, background image data and mask image data corresponding to the data of the kind of the certificate and the name of the municipality are selected by using the table shown in FIG. 10. In step 604, time/day/month/year of reception of a job is obtained. In step 606, the color of the background image and the mask image is determined according to the time/day/month/year of the reception. For example, the M color is determined for the period from January to March and the C color is determined for the period from April to June. The time/day/month/year of the reception of a job may be inputted from the terminal 18 or generated by the DB server on receipt of an output instruction. After the background image data and the mask image data are selected and the color is determined, in step 608, the latent-image-buried image data and the color data are supplied to the image inputting unit 30 in the merging unit 26. The color data is supplied to the inserting unit 48 via the color control unit 46 to designate the color of the latent-image-buried image data. Consequently, the image data having the determined color information is generated.

In the embodiment, in the DB server, merged data is generated by merging document data of a secret document read from the database of a city office with latent-image-buried image data and is transmitted to the printer as a destination, and the image based on the merged data is outputted. Consequently, the secret document to which the copy forgery preventing image is added can be outputted without using the copy forgery preventing sheet.

Since various latent-image-buried image data is used according to the kinds of certificates and the names of municipalities, the kind of the certificate and the name of the municipality can be easily determined.

Although different colors are used according to the time/day/month/year of reception of jobs in the above example, different colors may be used according to the kinds of certificates, municipalities, or the like. It is also possible to preliminarily determine time and day to change the color, for example, at midnight of the first day of every month and change the colors of all the stored latent-image-buried images.

(Fourth Embodiment)

A fourth embodiment of the invention will now be described. In the embodiment, a mask image is generated according to the ID number of the user, the IP address of a printer, and time/day/month/year of reception of a job transmitted from a terminal, and the above-described latent-image-buried image is generated by using the generated mask image.

Since the fourth embodiment is similar to the second embodiment, a description of the same part as that of the second embodiment will not be repeated and the different point will be mainly described. First, in the database 12, as shown in FIG. 20, various background image data is stored in a table by the names of municipalities and the kinds of certificates. In the fourth embodiment, a mask image is generated according to the ID number of the user or the like, a mask image is not stored in advance.

The processing operation of the DB server 14 is the same as that of the DB server 14 in the first embodiment shown in FIG. 7 except for step 206 where the process of determining the latent-image-buried image data is performed. A description of the same part will not be repeated.

As shown in FIG. 14, in the process of determining the latent-image-buried image data, in step 700, data of the ID number of the user, the IP address of a printer, and time/day/month/year of reception of a job is obtained. In step 702, the character strings are raster-developed to binary image data, thereby generating mask image data. In step 704, the kind of the certificate and the name of the municipality are obtained. In step 706, by using the table shown in FIG. 20, background image data corresponding to the kind of the certificate and the name of the municipality is selected. After the mask image data is generated and the background image data is selected, in step 708, the mask image data and the background image data are supplied to the image inputting unit 30 in the merging unit 26.

In the embodiment, in the DB server, merged data is generated by merging document data of a secret document read from the database of the city office with latent-image-buried image data and is transmitted to the printer as a destination, and the image based on the merged data is outputted. Consequently, the secret document to which the copy forgery preventing image is added can be outputted without using the copy forgery preventing sheet.

The mask image is generated each time a print is outputted in accordance with the ID number of the user, time/day/month/year of reception of a job, and the IP address of the printer which are transmitted from a terminal. Consequently, the storage capacity of the database may be small. Since a different mask image is supplied for each print output and an image in which a different latent image pattern (character string of the ID number of the user or the like) is buried is printed, even when the document is copied illegally, the distribution path of the illegal copy can be traced. In the embodiment, the character string made by the ID number of the user, time/day/month/year of reception of a job, and the IP address of the printer is used as the latent image pattern. The certificate outputted by "whom", "when", and "where" can be known from the latent image pattern visualized by copying. It becomes especially easy to trace the distribution path of the illegal copy.

Since different background images are prepared according to the kinds of certificates and the names of municipalities to thereby provide different latent-image-buried image data, the kind of the certificate and the name of the municipality issuing the certificate can be easily determined.

In the fourth embodiment as well, as described in the foregoing embodiments, for example, the color of at least one of the background image and the mask image may be changed in accordance with the kind of a certificate or the like. Although the case where the background image data is stored in advance has been described above, in a manner similar to the mask image, the data may be generated by using the ID number, IP address, and the like.

(Fifth Embodiment)

A fifth embodiment of the invention will now be described with reference to FIG. 15. In the fifth embodiment, by using not the DB server disposed on the database side but a print server disposed on the LAN in the store where the terminal or printer is provided, the latent-image-buried image data and the document image data are merged.

Figure 15:
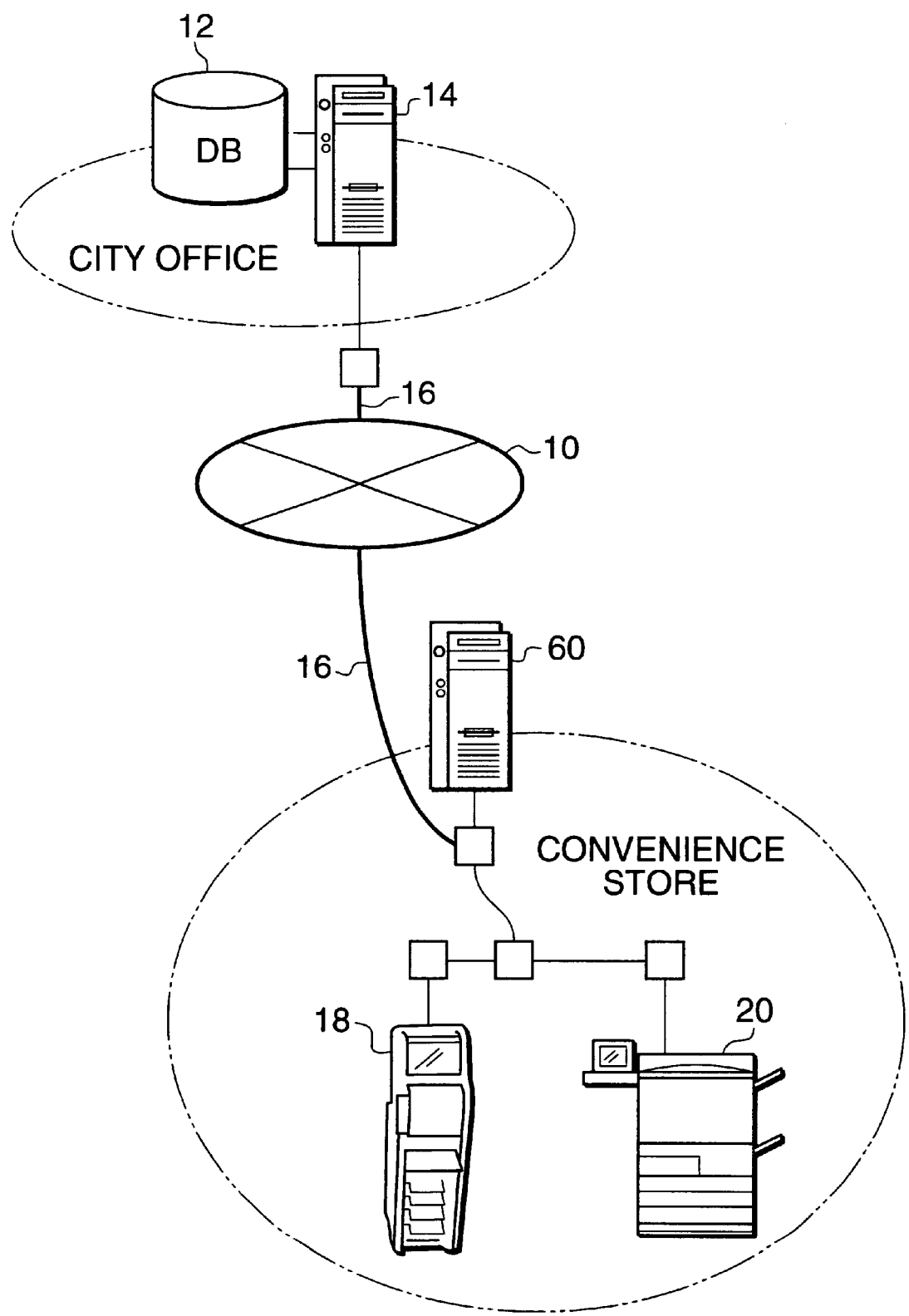
FIG. 15 is a conceptual diagram showing the configuration of a part of a recording medium outputting system according to a fifth embodiment.

As shown in FIG. 15, a recording medium outputting system is constructed by connecting a LAN having the DB server 14 for managing transmission/reception of data to/from the database 12 disposed in a municipality office such as a city office and a LAN having the terminal 18 for designating a document to be outputted or the like, the printer 20 for outputting the designated document, and a print server 60 which are installed in the store 22 such as convenience store or post office via the communication line 16 such as a telephone line and the Internet 10. Convenience stores and post offices are characterized by their large numbers. A number of LANs (not shown) are connected to the Internet 10.

Since the fifth embodiment is similar to the first embodiment, a description of the same part as that of the first embodiment will not be repeated and the different point will be mainly described. First, in the database 12, as shown in FIG. 21, only the number indicative of the kind of the latent-image-buried image (image number) is stored in a table in accordance with the name of the municipality and the kind of the certificate. In a manner similar to the DB server 14 shown in FIG. 3, the print server 60 has a transmitting/receiving unit, a merging unit, and a control unit. Further, the print server 60 has therein a memory in which the latent-image-buried image data is stored in a table in accordance with the same image number as that stored in the database 12 as shown in FIG. 22. It is also possible to provide a print server in the terminal 18 and not to provide the print server 60.

Figure 16:
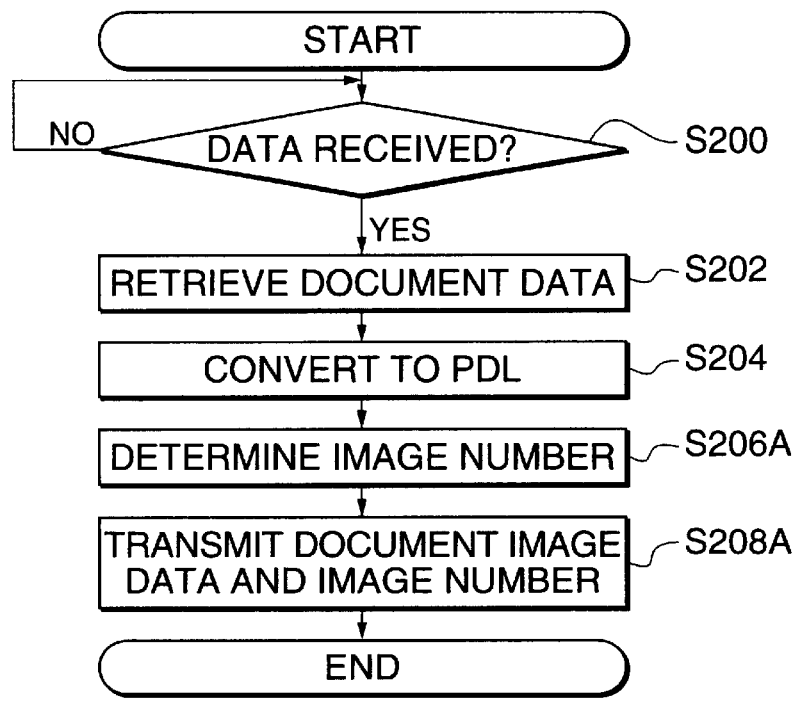
FIG. 16 is a flowchart showing the processing operation of a database server in the firth embodiment.

By referring to the flowchart shown in FIG. 16, the processing operation of the DB server 14 will now be described. Since the processing operation of the DB server 14 in the fifth embodiment is partially overlapped with that of the DB server 14 in the first embodiment shown in FIG. 7, the same numbers are designated with respect to the same steps.

When it is determined in step 200 that information read from the IC card of the user, information inputted from the touch panel, and the IP address sent from the terminal 18 are received by the transmitting/receiving unit 24, document data of a certificate instructed to be outputted is retrieved from the database 12 on the basis of the received information in step 202. In step 204, the retrieved document data is read and converted to document image data described in the PDL by using the printer driver installed in the DB server 14.

In step 206A, data of the kind of the certificate and the name of the municipality is obtained. By using the table shown in FIG. 21, the image number of the latent-image-buried image corresponding to the kind of the certificate and the name of the municipality is determined. After determining the image number, in step 208A, the document image data described in the PDL and the image number are transmitted to the print server 60.

Figure 17:
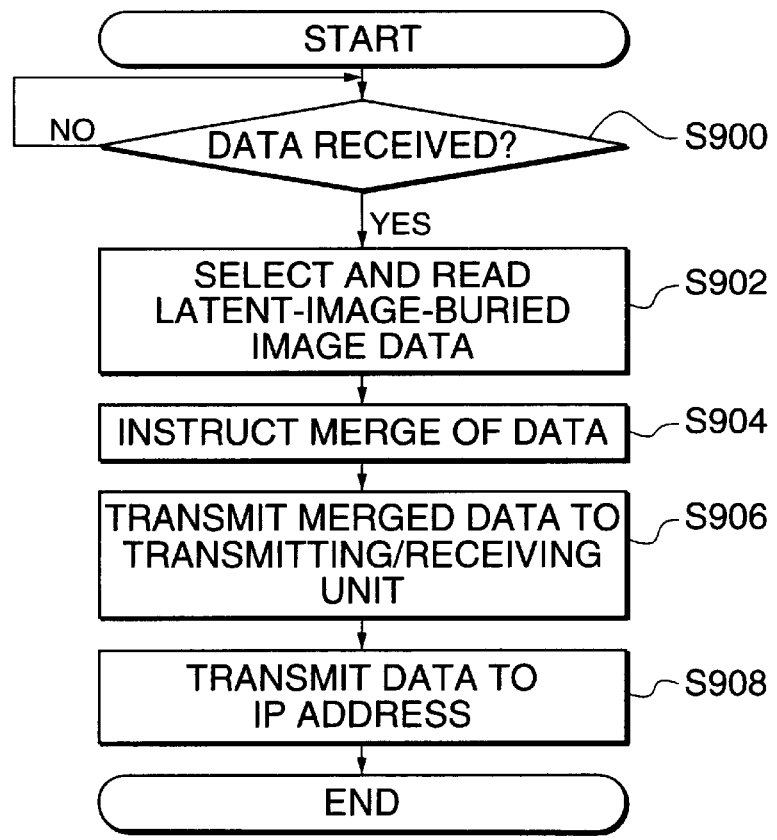
FIG. 17 is a flowchart showing the processing operation of a print server in the fifth embodiment.

With reference to the flowchart in FIG. 17, the processing operation of the print server 60 will now be described.

When it is determined in step 900 that the document image data described in the PDL and the image number which are transmitted from the DB server 14 are received, in step 902, by using the table shown in FIG. 22, the latent-image-buried image data is selected on the basis of the transmitted image number and read from the memory. In step 904, a merge between the document image data and the selected latent-image-buried image data is instructed to the merging unit in the print server 60. In the merging unit, after merging the data, the merged data is sent to the transmitting/receiving unit in step 906. In step 908, the merged data is controlled to be transmitted from the transmitting/receiving unit in the print server 60 to the printer 20.

In the embodiment, in the print server, merged data is generated by merging document data of a secret document read from the database of the city office with latent-image-buried image data and is transmitted to the printer as a destination, and the image based on the merged data is outputted. Thus, the secret document to which the copy forgery preventing image is added can be outputted without using the copy forgery preventing sheet.

Since the latent-image-buried image data is preliminarily generated and stored in the memory in the print server and is selected and merged with document data, just a short time is required to output a secret document from the printer. Particularly, in the embodiment, data transmitted from the database of the city office via the communication line and the Internet is only document data, a communication load is light, and the time required to output the document can be shortened.

Since various latent-image-buried image data is prepared according to the kinds of certificates and the municipality names, the kind of the certificate and the name of the municipality issuing the certificate can be easily determined.

Although the latent-image-buried image data preliminarily generated is stored in the memory of the print server, it is also possible to generate a mask image on the basis of the transmitted image number, or in a manner similar to the fourth embodiment, in accordance with the ID number of the user, the IP address of the printer, time/day/month/year of reception of a job, and the like transmitted from a terminal, and generate the latent-image-buried image data by using the generated mask image in the print server. In the case of generating the latent-image-buried image data in the print server, the merging unit in the print server has the configuration shown in FIG. 11.

In the foregoing first to fifth embodiments, as described hereinbelow, a certificate or the like can be outputted on condition that a charge is paid.

Figure 18:
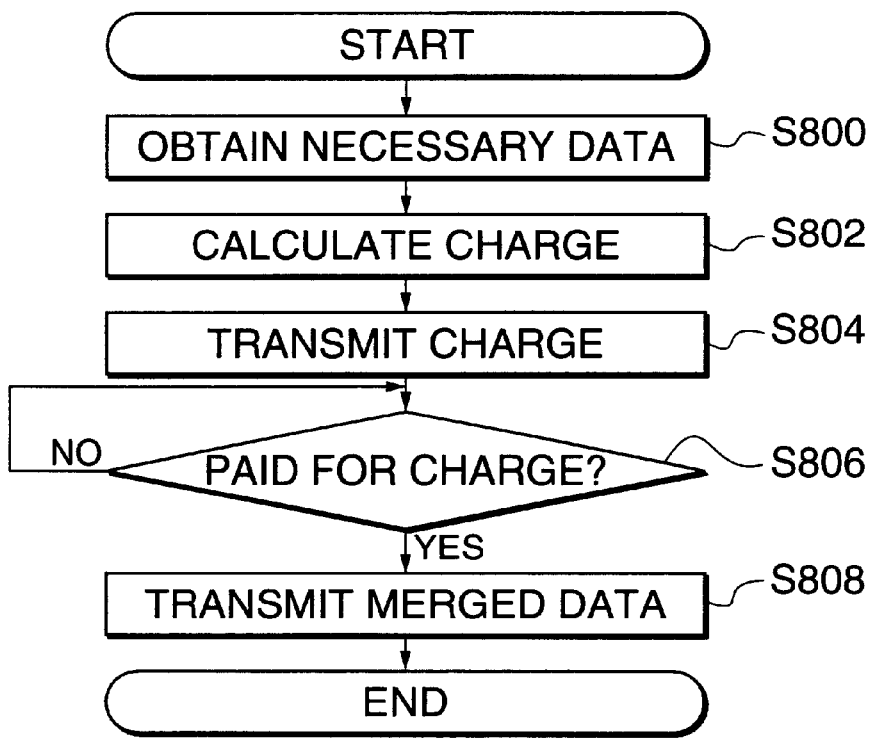
FIG. 18 is a flowchart showing the processing operation in a charging step.

In the first to fourth embodiments, as shown in FIG. 18, the DB server 14 captures data necessary for calculating a charge in step 800 and calculates the charge by, for example, referring to a preliminarily generated table in step 802. In step 804, the calculated charge data is transmitted to the terminal 18. When it is confirmed in step 806 that the charge has been paid, in step 808, document data (merged data) to which latent-image-buried image data is added is sent to the printer 20. Such a charging process can be performed in an arbitrary period since data indicative of the kind of a certificate is transmitted from the terminal 18 until merged data is transmitted. In the fifth embodiment, the print server 60 performs a similar processing operation.

The charge can be changed, for example, in consideration of use patterns of the user as described below. 1) Different charges are set for the user himself/herself and someone else (for example, his/her family member). 2) Different charges are set according to the kinds of certificates (for example, certificate of residence, copy of one's family register, document certifying that a seal is registered, and the like). 3) When an advertisement is placed on the document, the charge is reduced or waived. 4) Different charges are set according to issuing offices. 5) Different charges are set depending on whether or not an output position is in the jurisdiction (for example, in the city) of a municipality office (for example, out of the city). 6) Different charges are set according to the output positions such as the city office and stores such as a convenience store. 7) Different charges are set according to output time. For example, the charge is reduced or increased late at night.

The payment methods of the charge can be selected by the user from, for example, credit card, debit card, and cash by operating the touch panel of the terminal 18. When the user selects the payment by "cash", the user drops money in a slot provided in the terminal 18 or printer 20, thereby collecting the charge. When the user selects the payment by "credit card" or "debit card", the charge is withdrawn from the account of the user in a financial institution such as a bank by an on-line process.

Although the case where the charge is collected and then merged data is transmitted has been described above, it is also possible to collect the charge after merged data is transmitted. In this case, a slip is outputted from the printer and the charge may be collected by using a POS of a convenience store.

In the first to fifth embodiments, the case where one of two binary images of the dotted background image and the error-diffused background image is selected in accordance with a mask image, thereby generating a latent-image-buried image in which the mask image is buried as a latent image has been described. The method of generating a latent-image-buried image is not limited to this method. For example, a small image pattern corresponding to one cell of dithering is repeatedly formed in the whole screen, thereby forming a dither image. By replacing only the mask image portion with other small image patterns formed by an error diffusing process, a latent-image-buried image in which the mask image is buried as a latent image can be generated.

In the first to fifth embodiments, the case where document data is converted to image data described in the PDL and the image data is merged with the latent-image-buried image data has been described. It is also possible to convert document data into a binary image, convert the binary image into a raster image, and merge the raster image with latent-image-buried image data by OR merging.

In the first to fifth embodiments, the case of operating a terminal disposed in a convenience store to retrieve secret document data (for example, certificate of residence, copy of one's family register, or document certifying that a seal is registered) from the database of a city office, and outputting the retrieved data from a printer disposed in the same store has been descried. The invention can also be applied to every case of outputting a recording medium on which printing is made according to copy-forgery-inhibited data which is inhibited to be forged by copying, such as a case of outputting a document describing data of registered people from a database of an employee-leasing company, a case of outputting a contract sheet or the like from the database of a bank or securities company, a case of outputting a contract sheet or the like from the database of a nonlife insurance company, a case of outputting an airline ticket, a show ticket, or the like, and a case of outputting a picture (of a star).

In the first to fifth embodiments, the case of selecting or generating latent-image-buried image data in accordance with the kind of a certificate or the like and merging the latent-image-buried image data with document data has been described as an example. In the case where a document to be outputted is not a secret document such as a notification from a city office, it can be arranged not to add the latent-image-buried image data to the document. In the case of outputting an airline ticket or the like for a member, after authenticating the identification and membership of the user by the ID card or member card, it can also be arranged not to add latent-image-buried image data as a service for the member.

In the first to fifth embodiments, the position of forming the mask image in the latent-image-buried image data is not especially limited. It is also possible to merge the document image data with the latent-image-buried image data so that specific information having high confidentiality in document data and a mask image are overlapped with each other. By merging the document image data with the latent-image-buried image data so as to overlap specific information having high confidential in document data and a mask image with each other, for example, a portion of the mayor's seal in a certificate issued by a city office and a mask image, a seal portion in a document certifying that a seal is registered and a mask image, and an amount written portion in a security and a mask image, it becomes more difficult to forge the resultant document.

Figure 19:
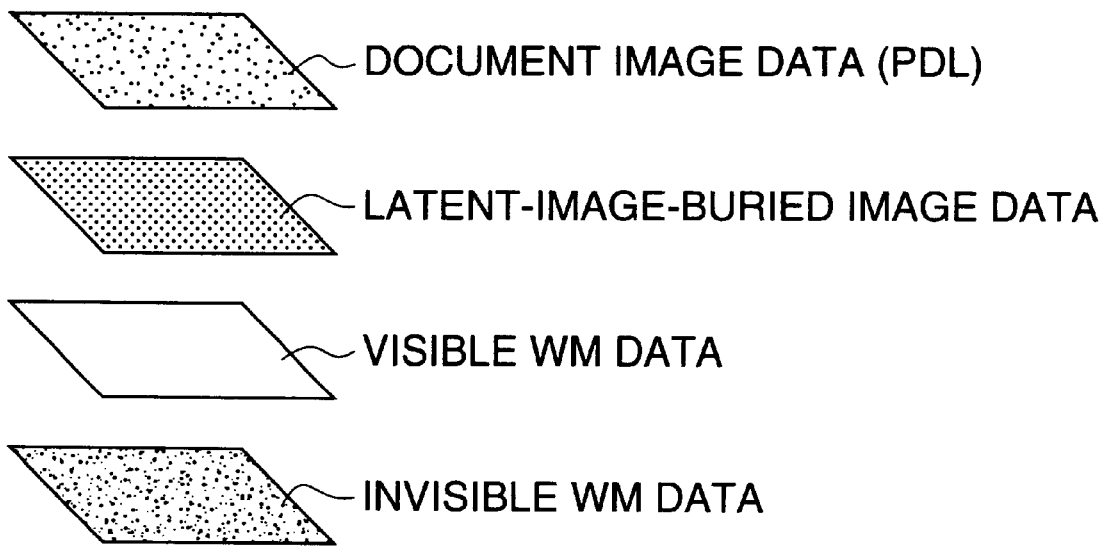
FIG. 19 is a diagram showing the kinds of image data to be merged.

Although the case of merging the latent-image-buried image data as copy forgery preventing image data with the document image data has been described in the first to fifth embodiments, copy forgery preventing image data other than the latent-image-buried image data can also be used. As shown in FIG. 19, in addition to the latent-image-buried image data, image data such as a visible watermark (visible WM) or invisible watermark (invisible WM) can be selected and merged as appropriate.

According to the invention, the copy forgery preventing image data capable of preventing forgery by copying is merged with the copy-forgery-inhibited-data which is inhibited to be forged by copying, and a recording medium on which printing is made according to the merged data is outputted. It produces an effect such that the printed recording medium inhibited to be forged by copying can be outputted without using a copy forgery preventing sheet.

By selecting the copy forgery preventing image data from a storing part in which the data is stored in advance and merging the selected data with document data, an effect is produced such that the time required to output a recording medium on which printing is made according to the merged data can be short.

By generating the copy forgery preventing image data and merging it with document data, an effect is produced such that small storage capacity of the database or the like is sufficient.

The entire disclosure of Japanese Patent Application No. 2000-168288 filed on Jun. 5, 2000 including specification, claims, drawings and abstract is incorporated herein by reference in its entirety.

What is claimed is:

1. A recording medium outputting method of outputting a recording medium on which printing is made according to copy-forgery-inhibited data inhibited to be forged by copying, comprising the steps of:

retrieving a piece of copy-forgery-inhibited data according to information inputted through a terminal from storing means in which plural pieces of copy-forgery-inhibited data inhibited to be forged by copying and plural pieces of copy forgery preventing image data of various kinds for preventing forgery by copying are stored, and selecting a piece of copy forgery preventing image data according to the retrieved piece of copy-forgery-inhibited data; and outputting a recording medium on which printing is made according to data obtained by merging the retrieved piece of copy-forgery-inhibited data with the selected piece of copy forgery preventing image data.

2. A recording medium outputting method of outputting a recording medium on which printing is made according to copy-forgery-inhibited data inhibited to be forged by copying, comprising the steps of:

retrieving a piece of copy-forgery-inhibited data according to information inputted through a terminal from storing means in which plural pieces of copy-forgery-inhibited data inhibited to be forged by copying are stored, and generating copy forgery preventing image data according to the retrieved piece of copy-forgery-inhibited data; and outputting a recording medium on which printing is made according to data obtained by merging the retrieved piece of copy-forgery-inhibited data with the generated copy forgery preventing image data.

3. The recording medium outputting method according to claim 2, wherein the information inputted through the terminal includes at least one of information regarding an operator of the terminal, information regarding a terminal for outputting a recording medium, and information regarding a time of outputting a recording medium, and the copy forgery preventing image data is generated according to the information inputted through the terminal.

4. The recording medium outputting method according to claim 1, wherein the kind of the copy forgery preventing image data is varied according to at least one of the kind of copy-forgery-inhibited data and a source of providing the copy-forgery-inhibited data.

5. The recording medium outputting method according to claim 1, wherein the copy forgery preventing image data is constructed of a background portion which is not reproduced by a copier and a latent image portion reproduced by the copier, or of a background portion which is reproduced by a copier and a latent image portion which is not reproduced by the copier, and the kind of the copy forgery preventing image data is varied by changing the shape of the latent image portion or changing at least one of a color of the latent image portion and a color of the background portion.

6. The recording medium outputting method according to claim 5, wherein the color of the copy forgery preventing image data to be merged is changed according to at least one of the kind of the copy-forgery-inhibited data, a source of providing the copy-forgery-inhibited data, and a time of outputting a recording medium.

7. The recording medium outputting method according to claim 1, wherein a charge is varied according to at least one of an operator of the terminal, the kind of copy-forgery-inhibited data, presence or absence of an advertisement in the recording medium, a position of outputting the recording medium, and a time of outputting the recording medium.

8. A database server comprising:

a database for storing plural pieces of copy-forgery-inhibited data inhibited to be forged by copying and plural pieces of copy forgery preventing image data of various kinds for preventing forgery by copying;

retrieving and selecting means for retrieving a piece of copy-forgery-inhibited data according to information inputted through a terminal from the database, and selecting a piece of copy forgery preventing image data according to the retrieved piece of copy-forgery-inhibited data; and outputting means for outputting the retrieved piece of copy-forgery-inhibited data and the selected piece of copy forgery preventing image data.

9. A database server comprising:

a database for storing plural pieces of copy-forgery-inhibited data inhibited to be forged by copying;

retrieving means for retrieving a piece of copy-forgery-inhibited data according to information inputted through a terminal from the database;

generating means for generating copy forgery preventing image data according to the retrieved piece of copy-forgery-inhibited data; and outputting means for outputting the retrieved piece of copy-forgery-inhibited data and the generated copy forgery preventing image data.

10. The database server according to claim 9, wherein the information inputted through the terminal includes at least one of information regarding an operator of the terminal, information regarding a terminal for outputting a recording medium, and information regarding a time of outputting a recording medium, and the copy forgery preventing image data is generated according to the information inputted through the terminal.

11. The database server according to claim 8, wherein the kind of the copy forgery preventing image data is varied according to at least one of the kind of copy-forgery-inhibited data and a source of providing the copy-forgery-inhibited data.

12. The database server according to claim 8, wherein the copy forgery preventing image data is constructed of a background portion which is not reproduced by a copier and a latent image portion reproduced by the copier, or of a background portion which is reproduced by a copier and a latent image portion which is not reproduced by the copier, and the kind of the copy forgery preventing image data is varied by changing the shape of the latent image portion or at least one of a color of the latent image portion and a color of the background portion.

13. The database server according to claim 12, wherein the color of the copy forgery preventing image data to be merged is changed according to at least one of the kind of the copy-forgery-inhibited data, a source of providing the copy-forgery-inhibited data, and a time of outputting a recording medium.

14. The database server according to claim 8, wherein a charge is varied according to at least one of an operator of the terminal, the kind of copy-forgery-inhibited data, presence or absence of an advertisement in the recording medium, a position of outputting the recording medium, and a time of outputting the recording medium.

15. A recording medium outputting apparatus for outputting a recording medium on which printing is made according to copy-forgery-inhibited data inhibited to be forged by copying, comprising:

first storing means for storing plural pieces of copy-forgery-inhibited data inhibited to be forged by copying;

receiving means for receiving a piece of copy-forgery-inhibited data retrieved from the first storing means in accordance with information inputted through a terminal;

second storing means for storing plural pieces of copy forgery preventing image data of different kinds for preventing forgery by copying;

selecting means for selecting a piece of copy forgery preventing image data according to the received piece of copy-forgery-inhibited data from the second storing means; and outputting means for outputting a recording medium on which printing is made according to data obtained by merging the received piece of copy-forgery-inhibited data and the selected piece of copy forgery preventing data.

16. A recording medium outputting apparatus for outputting a recording medium on which printing is made according to copy-forgery-inhibited data inhibited to be forged by copying, comprising:

storing means for storing plural pieces of copy-forgery-inhibited data inhibited to be forged by copying;

receiving means for receiving a piece of copy-forgery-inhibited data retrieved from the storing means in accordance with information inputted through a terminal;

generating means for generating copy forgery preventing image data according to the received piece of copy-forgery-inhibited data; and outputting means for outputting a recording medium on which printing is made according to data obtained by merging the received piece of copy-forgery-inhibited data with the generated copy forgery preventing image data.

17. The recording medium outputting apparatus according to claim 16, wherein the information inputted from the terminal includes at least one of information regarding an operator of the terminal, information regarding a terminal for outputting a recording medium, and information regarding a time of outputting a recording medium, and the copy forgery preventing image data is generated according to the information from the terminal.

18. The recording medium outputting apparatus according to claim 15, wherein the kind of the copy forgery preventing image data is varied according to at least one of the kind of copy-forgery-inhibited data and a source of providing the copy-forgery-inhibited data.

19. The recording medium outputting apparatus according to claim 15, wherein the copy forgery preventing image data is constructed of a background portion which is not reproduced by a copier and a latent image portion reproduced by the copier, or of a background portion which is reproduced by a copier and a latent image portion which is not reproduced by the copier, and the kind of the copy forgery preventing image data is varied by changing the shape of the latent image portion or changing at least one of a color of the latent image portion and a color of the background portion.

20. The recording medium outputting apparatus according to claim 19, wherein the color of the copy forgery preventing image data to be merged is changed according to at least one of the kind of the copy-forgery-inhibited data, a source of providing the copy-forgery-inhibited data, and a time of outputting a recording medium.

21. The recording medium outputting apparatus according to claim 15, wherein a charge is varied according to at least one of an operator of the terminal, the kind of copy-forgery-inhibited data, presence or absence of an advertisement in the recording medium, a position of outputting the recording medium, and a time of outputting the recording medium.

22. A recording medium outputting system comprising:

a terminal connected to a computer network, from which information for outputting a recording medium on which printing is made according to copy-forgery-inhibited data inhibited to be forged by copying is inputted;

a database in which plural pieces of copy-forgery-inhibited data inhibited to be forged by copying and plural pieces of copy forgery preventing image data of various kinds for preventing forgery by copying are stored; and a database server connected to the computer network, which includes retrieving and selecting means for retrieving a piece of the copy-forgery-inhibited data from the database in accordance with information inputted from the terminal and selecting a piece of copy forgery preventing image data according to the retrieved piece of copy-forgery-inhibited data, and outputting means for merging the retrieved piece of copy-forgery-inhibited data and the selected piece of copy forgery preventing image data and outputting the merged data.

23. A recording medium outputting system comprising:

a terminal connected to a computer network, from which information for outputting a recording medium on which printing is made according to copy-forgery-inhibited data inhibited to be forged by copying is inputted;

a database in which plural pieces of copy-forgery-inhibited data inhibited to be forged by copying are stored;

a database server connected to the computer network, which includes retrieving means for retrieving a piece of the copy-forgery-inhibited data from the database in accordance with information inputted from the terminal, and outputting means for outputting the retrieved piece of copy-forgery-inhibited data; and a print server connected to the computer network, which includes a memory in which plural pieces of copy forgery preventing image data of different kinds for preventing forgery by copying are stored, selecting means for selecting a piece of copy forgery preventing image data according to the retrieved piece of copy-forgery-inhibited data, and outputting means for merging the retrieved piece of copy-forgery-inhibited data and the piece of selected copy forgery preventing image data and outputting the merged data.

24. A recording medium outputting system comprising:

a terminal connected to a computer network, from which information for outputting a recording medium on which printing is made according to copy-forgery-inhibited data inhibited to be forged by copying is inputted;

a database in which plural pieces of copy-forgery-inhibited data inhibited to be forged by copying are stored; and a database server connected to the computer network, which includes retrieving means for retrieving a piece of the copy-forgery-inhibited data from the database in accordance with the information inputted from the terminal, generating means for generating copy forgery preventing image data according to the retrieved piece of copy-forgery-inhibited data, and outputting means for merging the retrieved piece of copy-forgery-inhibited data and the generated copy forgery preventing image data and outputting the merged data.

25. A recording medium outputting system comprising:

a terminal connected to a computer network, from which information for outputting a recording medium on which printing is made according to copy-forgery-inhibited data inhibited to be forged by copying is inputted;

a database in which plural pieces of copy-forgery-inhibited data inhibited to be forged by copying is stored;

a database server connected to the computer network, which includes retrieving means for retrieving a piece of the copy-forgery-inhibited data from the database in accordance with the information inputted from the terminal, and outputting means for outputting the retrieved piece of copy-forgery-inhibited data; and a print server connected to the computer network, which includes generating means for generating copy forgery preventing image data according to retrieved piece of copy-forgery-inhibited data, and outputting means for merging the retrieved piece of copy-forgery-inhibited data and the generated copy forgery preventing image data and outputting the merged data.

26. The recording medium outputting system according to claim 24, wherein the information inputted from the terminal includes at least one of information regarding an operator of the terminal, information regarding a terminal for outputting a recording medium, and information regarding a time of outputting a recording medium, and the copy forgery preventing image data is generated according to the information from the terminal.

27. The recording medium outputting system according to claim 22, wherein the kind of the copy forgery preventing image data is varied according to at least one of the kind of copy-forgery-inhibited data and a source of providing the copy-forgery-inhibited data.

28. The recording medium outputting system according to claim 22, wherein the copy forgery preventing image data is constructed of a background portion which is not reproduced by a copier and a latent image portion reproduced by the copier, or of a background portion which is reproduced by a copier and a latent image portion which is not reproduced by the copier, and the kind of the copy forgery preventing image data is varied by changing the shape of the latent image portion or at least one of a color of the latent image portion and a color of the background portion.

29. The recording medium outputting system according to claim 28, wherein the color of the copy forgery preventing image data to be merged is changed according to at least one of the kind of the copy-forgery-inhibited data, a source of providing the copy-forgery-inhibited data, and a time of outputting a recording medium.

30. The recording medium outputting system according to claim 22, wherein a charge is varied according to at least one of an operator of the terminal, the kind of copy-forgery-inhibited data, presence or absence of an advertisement in the recording medium, a position of outputting the recording medium, and a time of outputting the recording medium.

* * * * *